United States Patent [19]
Kim et al.

[11] Patent Number: 6,088,317
[45] Date of Patent: Jul. 11, 2000

[54] OPTICAL PICK-UP APPARATUS CAPABLE OF READING DATA IRRESPECTIVE OF DISC TYPE

[75] Inventors: Jin-Yong Kim, Kyungki-Do; Dae-Young Kim; Man-Hyung Lee, both of Seoul; Song-Chan Park; In-Sang Song, both of Kyungki-Do, all of Rep. of Korea

[73] Assignee: LG Electronics, Inc., Seoul, Rep. of Korea

[21] Appl. No.: 09/333,264

[22] Filed: Jun. 15, 1999

Related U.S. Application Data

[63] Continuation of application No. 08/567,041, Dec. 4, 1995, Pat. No. 6,026,065.

[30] Foreign Application Priority Data

| Mar. 4, 1995 | [KR] | Rep. of Korea | 95-4410 |
| Mar. 6, 1995 | [KR] | Rep. of Korea | 95-4525 |
| Mar. 26, 1995 | [KR] | Rep. of Korea | 95-6238 |
| Oct. 31, 1995 | [KR] | Rep. of Korea | 95-39516 |

[51] Int. Cl.$^7$ ................................................. G11B 3/90
[52] U.S. Cl. ........................................... 369/58; 369/54
[58] Field of Search .......................... 369/58, 94, 54, 369/44.23, 110, 112, 118, 275.3

[56] References Cited

U.S. PATENT DOCUMENTS

| 5,097,464 | 3/1992 | Nishiuchi et al. ..................... 369/118 |
| 5,157,555 | 10/1992 | Reno . | |
| 5,235,581 | 8/1993 | Miyagawa et al. ..................... 369/112 |
| 5,281,797 | 1/1994 | Tatsuno et al. . | |
| 5,487,060 | 1/1996 | Rosen et al. ..................... 369/94 |
| 5,513,164 | 4/1996 | Tanaka et al. ..................... 369/110 |
| 5,526,336 | 6/1996 | Park et al. ..................... 369/44.37 |

FOREIGN PATENT DOCUMENTS

| 62003441 | 1/1987 | European Pat. Off. . |
| 0329234 | 8/1989 | European Pat. Off. . |
| 0414380 | 2/1991 | European Pat. Off. . |
| 0470807 | 2/1992 | European Pat. Off. . |
| 0537904 | 4/1993 | European Pat. Off. . |
| 5120720 | 5/1993 | European Pat. Off. . |
| 6020298 | 1/1994 | European Pat. Off. . |
| 0610055 | 8/1994 | European Pat. Off. . |
| 8138262 | 5/1996 | European Pat. Off. . |
| 8-138262 | 5/1996 | Japan . |

OTHER PUBLICATIONS

Patent Abstract of Japan; Publication No. 08138262 A; published May 31, 1996.

*Primary Examiner*—Thang V. Tran

[57] ABSTRACT

An improved optical pick-up apparatus capable of reading data irrespective of disc type capable of reading various kinds of discs having different thicknesses and writing densities using only one pick-up apparatus, which includes a light source; a beam splitter for passing through or splitting a beam from the light source; an objective lens for condensing the beam onto corresponding disc among discs having different thicknesses and different densities; a numerical aperture control unit for controlling an effective numerical aperture of the objective lens so as to execute a focussing operation with respect to a certain disc; and a photo-detector for receiving the beam reflected by the disc and transmitted from the beam splitter.

19 Claims, 30 Drawing Sheets

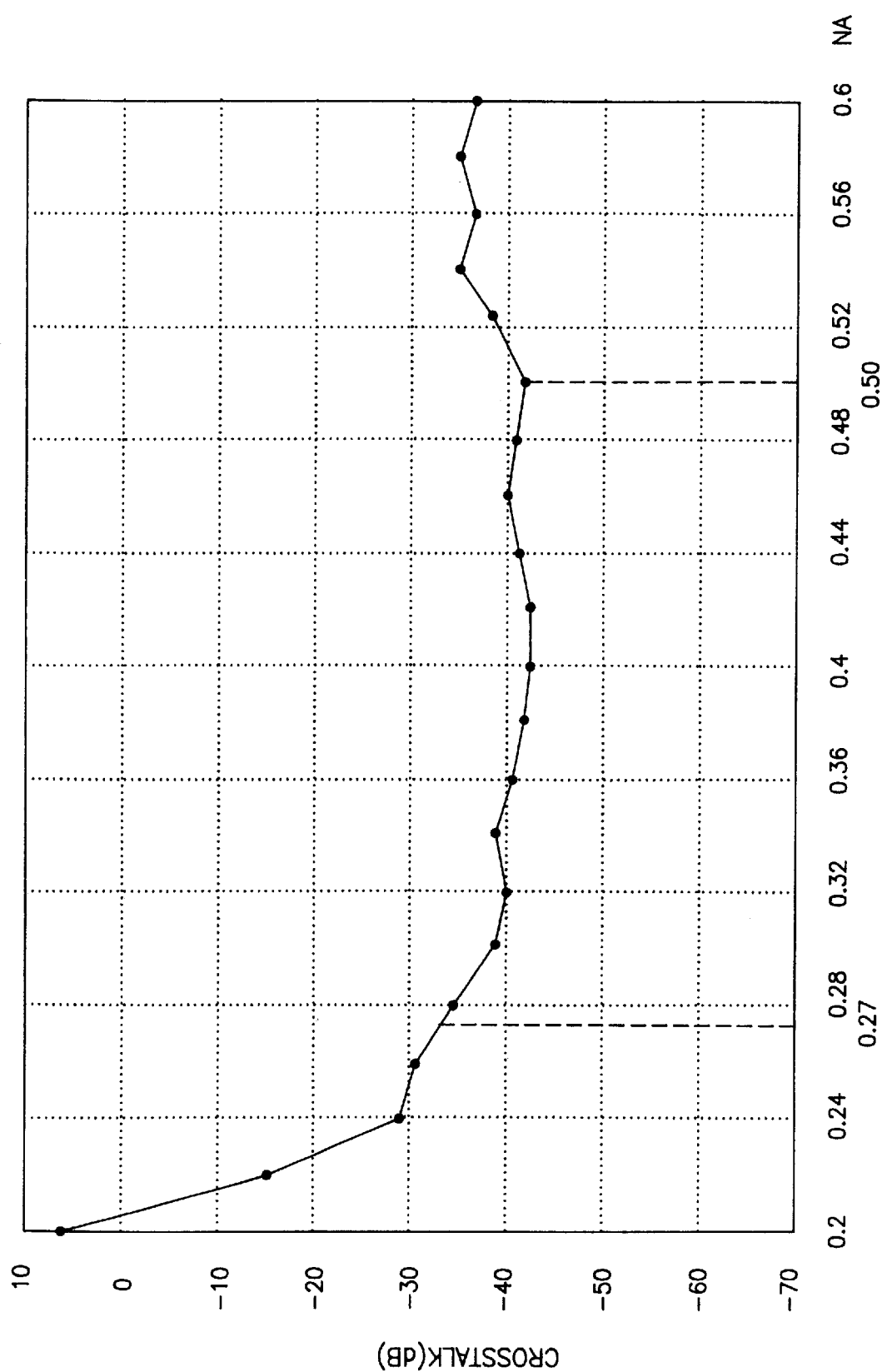

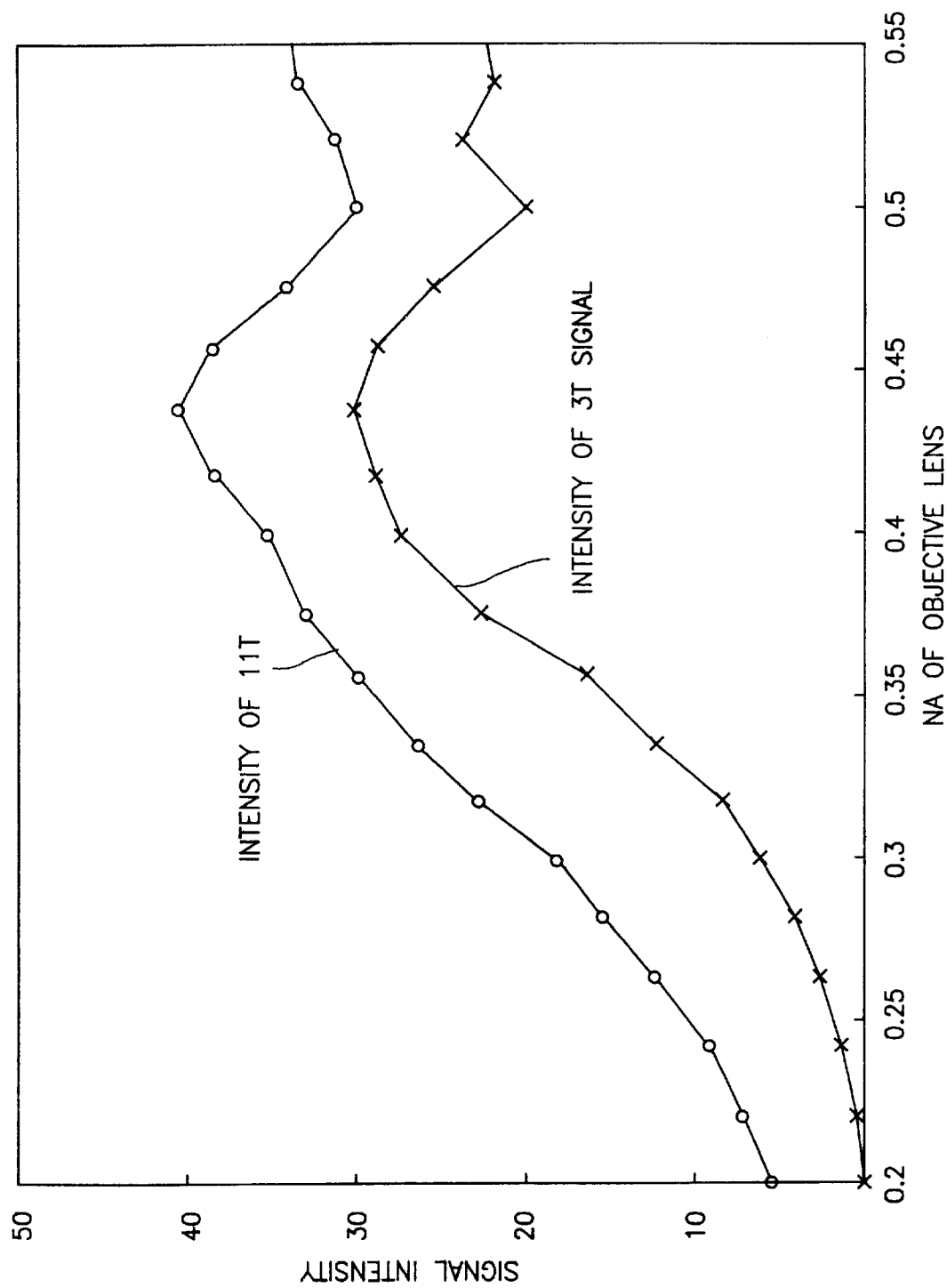

OPTICAL PICK-UP APPARATUS CAPABLE OF READING DATA IRRESPECTIVE OF DISC TYPE

This application is a continuation of application Ser. No. 08/567,041, filed on Dec. 4, 1995, now U.S. Pat. No. 6,026,065, the entire contents of which are hereby incorporated by reference.

BACKGROUND OF THE INVENTION

1. Field of the Invention

The present invention relates to an optical pick-up apparatus capable of reading data irrespective of a disc type, and in particular to an improved optical pick-up apparatus capable of reading data irrespective of a disc type capable of reading a certain disc among disc having different thicknesses and writing densities using only one pick-up apparatus.

2. Description of Related Art

Generally, a digital video disk (DVD) is provided with a red semiconductor laser and an objective lens having a larger numeric aperture (NA). The above-mentioned DVD has six or eight times the writing data capacity of a compact disc (CD), in which compressed video and audio data can be stored therein. That is, the data corresponding to that of a movie can be stored in a disc of 120 mm.

The DVD uses a red semiconductor laser having a wave length of 635 nm or 650 nm.

Generally, if the wave length of light source becomes short, the diameter of a laser spot decreases in proportion thereto, so that both a track pitch and a minimum writing mark length can be reduced. That is, since the surface of the writing mark is in duplicate proportion to the wave length of a writing mark, overall writing area can be decreased.

Meanwhile, the spot diameter of the laser is proportional to the wave length of the light source. Therefore, if the numeric aperture is increased, without varying the wave length, it is possible to increase the writing intensity. Therefore, the numeric aperture in the optical system for a CD is about 0.45, but it is about 0.6 in the DVD.

There are three methods below of reading the disc data in the conventional DVD as follows.

The first is to simply increase the numeric aperture by a small amount. The second is to adopt a tilt angle compensation device, called a tilt servo, in the optical pick-up system, instead of increasing the numeric aperture to more than 0.52. The third is to increase the numeric aperture up to 0.6 and to reduce the laser transmitting distance through a disc plate.

The construction of a conventional optical pick-up apparatus will now be explained.

Referring to FIG. 1, the conventional optical pick-up apparatus includes a diffraction grating 2 for dividing a beam from a light source 1 into a main beam and two sub-beams for a tracking servo. In addition, the beams from the diffraction grating 2 is transmitted to an objective lens 5, provided for condensing the light on a spot of an optical disc 6, through a collimator lens 4 for outputting a parallel light through a beam splitter 3. In addition, the optical detector 8 detects a beam data signal transmitted from a sensor lens 7 for condensing the beam.

The operation of the conventional optical pick-up apparatus will now be explained with reference to the accompanying drawings.

The beam from the light source 1 is converted into a parallel light by the collimator lens through the beam splitter 3. The beam is focused by the objective lens 5 and reflected or diffracted by information writing surface on an information media. The thusly reflected beam returns on the same path and is converted into an electric signal by the photo-detector 8. That is, the beam is transmitted to the photo-detector 8 through another path formed by the beam splitter 3 through the sensor lens 7.

Meanwhile, the diffraction grating 2 and the sensor lens 7 are widely used with respect to tracking using a three beam method and to astigmatism method a focusing servo.

A high density optical disc has four times the capacity of a conventional compact disc, and the data stored therein can be reproduced using a lens having a numerical aperture of about 0.6. In this case, the aberration due to the disc inclination increases as the thickness of a disc increases. In order to resolve the above problem, the standard of a digital video disc requires the thickness of a disc to be 0.6 mm.

At this time, the optical system, as shown in FIG. 1, includes a high density optical disc having a thickness of 0.6 mm and a compact disc having a thickness of 1.2 mm. However, the above-mentioned optical system has the following problems.

For example, the beam intensity distribution at a focal point on a disc surface using and a disc having a thickness of 0.6 mm and an objective lens having a numerical aperture of 0.6 is shown in FIG. 2 as a solid line. When a beam is focused at a disc having a thickness of 1.2 mm through the objective lens 5, the beam intensity distribution is shown as a dashed line in FIG. 2 due to the spherical aberration of the lens.

That is, the beam intensity ratio of the main lobe significantly decreases, and the beam intensity of the side lobe increases, so that crosstalk of the signal written on its neighboring track of the disc increases.

In addition, the optical pick-up apparatus cannot reproduce the data stored in a disc of 1.2 mm because the sensitivity with respect to a disc tilt level is too high as shown in FIG. 1 in case the data is read using an objective lens having a numerical aperture of 0.6 mm.

SUMMARY OF THE INVENTION

Accordingly, it is an object of the present invention to provide an optical pick-up apparatus capable of reading a data irrespective of disc type, which overcome the problems encountered in a conventional optical pick-up apparatus not capable of reading data irrespective of disc type.

It is another object of the present invention to provide an improved optical pick-up apparatus capable of reading data irrespective of disc type capable of reading various kinds of discs having different thicknesses and writing densities, using only one pick-up apparatus.

To achieve the above objects, there is provided an optical pick-up apparatus capable of reading data irrespective of disc type, which includes a light source; a beam splitter for passing light from the light source or splitting a beam from the light source; an objective lens for appropriately focusing the beam onto a disc having a certain thickness and recording densities; a numerical aperture control unit for controlling an effective numerical aperture of the objective lens so as to execute a focussing operation with respect to a certain type of disc; and a photo-detector for receiving the beam reflected by the disc and reflected by the beam splitter, thus reading a data irrespective of disc type, thus allowing the reading of discs among disc having different thicknesses and writing densities using only one pick-up apparatus.

BRIEF DESCRIPTION OF THE DRAWINGS

FIG. 9A is a graph showing crosstalk in accordance with a variation of a numerical aperture of an objective lens according to the present invention.

FIG. 9B is a graph showing a reproducing signal in accordance with a variation of a numerical aperture of an objective lens according to the present invention.

DETAILED DESCRIPTION OF THE INVENTION

Figure 1:
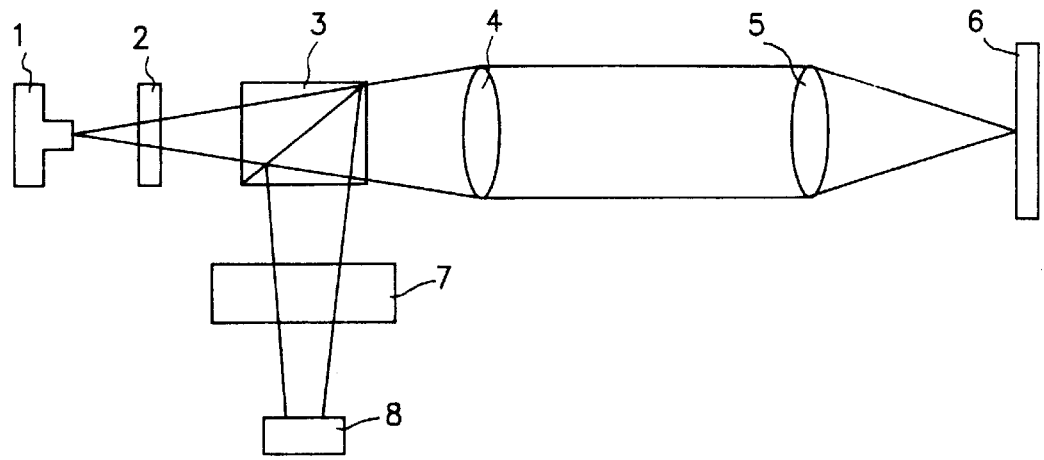
FIG. 1 is a schematic view showing a conventional optical pick-up apparatus.
Figure 2:
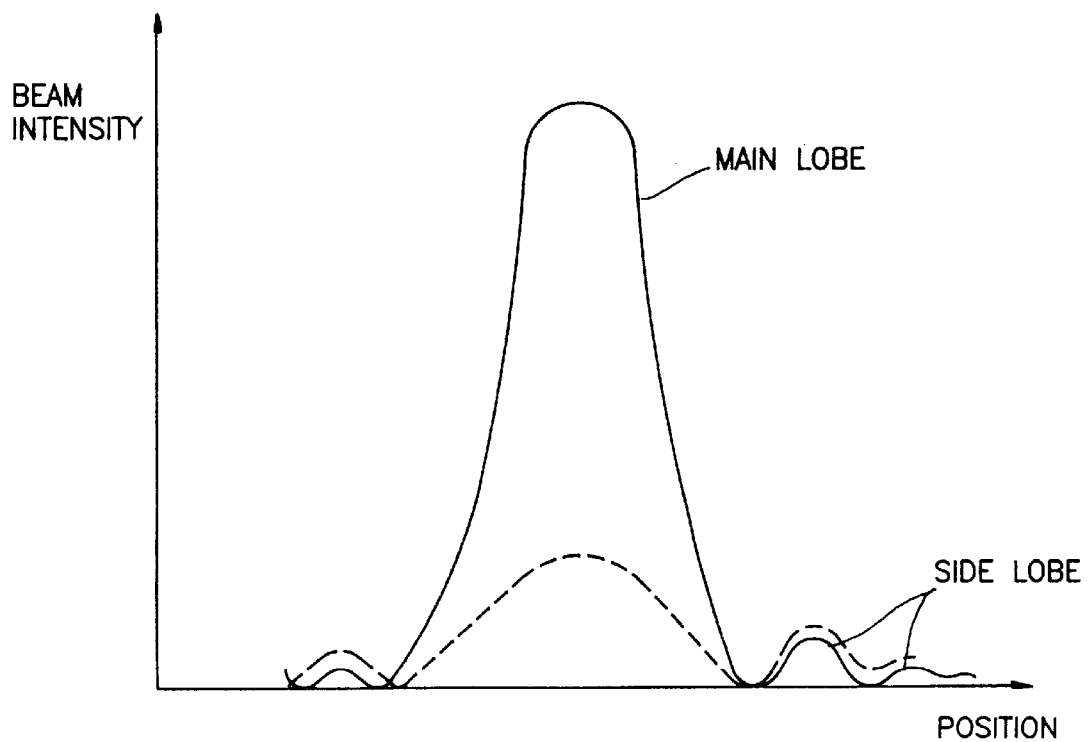
FIG. 2 is a graph of a beam intensity distribution on discs having different thicknesses in a conventional optical pick-up apparatus.

To begin with, the optical pick-up apparatus adopted in the present invention and an optical system with non-aberration of a first embodiment according to the present invention will now be explained.

The spot size formed by the aberration free optical system can be computed by the following expression using a diffraction of a light.

$$\text{Spot size} = K\lambda/2(N.A) \quad (1)$$

where K denotes a constant determined in accordance with a light intensity distribution characteristic in a light such as a plain wave, Gaussian beam, or a truncated beam, and λ denotes a wave length of the light source adopted in the expression above, and N.A. denotes a predetermined numerical aperture.

According to the formula (1), when the numerical aperture increases, the spot size decreases. For example, in case of a high density disc having a thickness of 0.6 mm, since the distance between tracks and the diameter of pits are small, a certain spot having a relatively small size is necessary, and an objective lens having a high numerical aperture is needed. However, in case of a disc having a thickness of 1.2 mm, since the distance between tracks and the size of pits are bigger than that of the disc having a thickness of 0.6 mm, even though the spot size slightly increases, it is possible to read out data and to use an objective lens having a small effective numerical aperture when reading a high density disc.

The relationship between the numerical aperture and the size of a bundle of lights incident to the objective lens can be expressed as follows.

$$D = 2f(N.A) \quad (2)$$

where D denotes the diameter of a bundle of incident lights, and f denotes a focal length of an objective lens.

That is, when the size of a bundle of incident lights of an objective lens having the same focal length is controlled, the effective numerical aperture of the objective lens can be changed.

Meanwhile, when reading the data stored on a disc having a thickness of 1.2 mm in an optical system including an objective lens having a numerical aperture of 0.6 and a high density disc having a thickness of 0.6 mm, the following problems occur.

First, if focal compensation is not performed, a proper focussing cannot be achieved due to a blurring phenomenon.

Second, the S/N ratio decrease due to the increase of the crosstalk due to signal interference between neighboring tracks because of the decrease of a central intensity distribution due to the spherical aberration which occurs by the thickness variation of the disc and the increase of the distribution amount of a first side robe.

Third, the optical system becomes unstable due to coma aberration and astigmatism, which occur due to the disc inclination.

Thus, it becomes impossible to read out the data stored on a disc because the optical performance decreases, as explained above.

Meanwhile, the amount of the spherical aberration due to the thickness variation of a disc can be computed by the following expression.

$$\Delta WFE_{SA-RMS} = (n^2 - 1/8\sqrt{180}\, n^3)(NA)^4 \Delta d \quad (3)$$

where n denotes a refractive index of a disc, Δd denotes a thickness variation amount, NA denotes a numerical aperture.

In addition, the aberration occurring amount due to a defocussing can be computed by the following expression.

$$\Delta WFE_{DF-RMS} = (1/4\,3)(NA)^2 \Delta Z \quad (4)$$

where Δz denotes a defocussing amount.

When computing the amount of aberration which occur and the central intensity distribution in case of reading data stored on the disc having a thickness of 1.2 mm using an objective lens having a numerical aperture of 0.6, and of reading data stored therein by varying the effective numerical aperture of the objective lens to have 0.3 using a numerical aperture control unit, by moving the focus to the data writing surface of a disc having a thickness of 1.2 mm, and by removing any interferences with respect to defocussing, the following table can be obtained. At this time, the total-root-mean-square wave front aberration of the entire optical system, in which an approximate non-aberration can be expressed as a relationship to the central intensity distribution, should be lower than 0.07 λ, wherein the central intensity distribution is over 80%, in accordance with Marechal's criterion.

| | in case of reading data stored in a disc of 1.2 mm using an objective lens of numerical aperture of 0.6 | in case of reading data stored in a disc of 1.2 mm using an objective lens after varying a numerical aperture to have 0.3 |
|---|---|---|
| Spherical aberration occurrence amount due to thickness variation by 0.6 mm | 0.43λ | 0.027λ |
| aberration occurrence amount by a defocussing (RMS) | 31.67λ (—) | — |
| entire aberration occurrence amount (RMS) | 31.67λ (0.43λ) | 0.027λ |
| central intensity distribution | defies Marechal's criterion | over 95% |

*Values in ( ) denote a value when defocussing compensation is performed.

As shown in the above table, by varying an effective numerical aperture of the objective lens adopted therein, by moving the focus to the data writing surface of a disc of 1.2 mm, and removing any interferences with respect to defocussing, it is possible to read the data.

In addition, when the effective numerical aperture of the objective lens is varied using the numerical aperture control unit, since the aberration occurrence amount with respect to the disc inclination can be reduced as follows, a more stable optical system can be achieved.

$$\Delta WFE_{CM-RMS} = (n^2 - 1/2\sqrt{72}\, n^3)(NA)^3 d\theta \quad (5)$$

When the refractive index "n" in accordance with the expression (5) is 1.55, the thickness of a disc is 1.2 mm, the inclination of the disc is 0.6°, and the wave length is 635 nm, the aberration occurrence amount is given as follows.

| | objective lens having a numerical aperture of 0.6 | objective lens having a numerical aperture of 0.3 |
|---|---|---|
| aberration occurrence amount | 0.090λ | 0.011λ |

However, as expressed in the expression (1), if the effective numerical aperture is decreased, the beam spot size increases with respect to the diffraction, and when the spct size exceeds a predetermined value which is determined by the disc type, crosstalk occurs due to the increase of the spot size rather than by the intensity distribution variation due to the aberration, so that the S/N ratio of the reading-out signal becomes unsatisfactory.

Therefore, an effective numerical aperture value exists within a certain rance of values, and the maximum value of the effective numerical is limited by a variation condition of the intensity distribution of the occurrence aberration, while the minimum is limited by the increase of spot size.

So as to meet the above conditions, in case of using an objective lens having a numerical aperture of 0.6 with respect to a disc having a thickness of 0.6mm, the effective numerical aperture can be obtained by the following expression when reading the data stored in a compact disc.

$$0.27 < \text{effective numerical aperture} < 0.50 \quad (6)$$

With respect to the range of the above-mentioned effective numerical aperture, please refer to the description of FIGS. 9A and 9B to be explained hereinafter. That is, FIG. 9A shows crosstalk variations in accordance with a numerical aperture variation of an objective lens, and FIG. 9B shows an amount variation of a reproducing signal in accordance with a numerical aperture variation of an objective lens.

According the above-explained principles, in the optical pick-up apparatus capable of reading data written in a high density disc having a larger numerical aperture and a thin thickness, as a method of reading data stored in a disc having a thick thickness and a low density, the inventor of the present invention understood that the objects of the present invention can be achieved by changing the effective numerical aperture of the objective lens to meet the conditions of the expression (6) by providing a numerical aperture control unit.

The construction of an optical pick-up apparatus capable of reading data irrespective of disc type of a first embodiment according to the present invention will now be explained.

Figure 3:
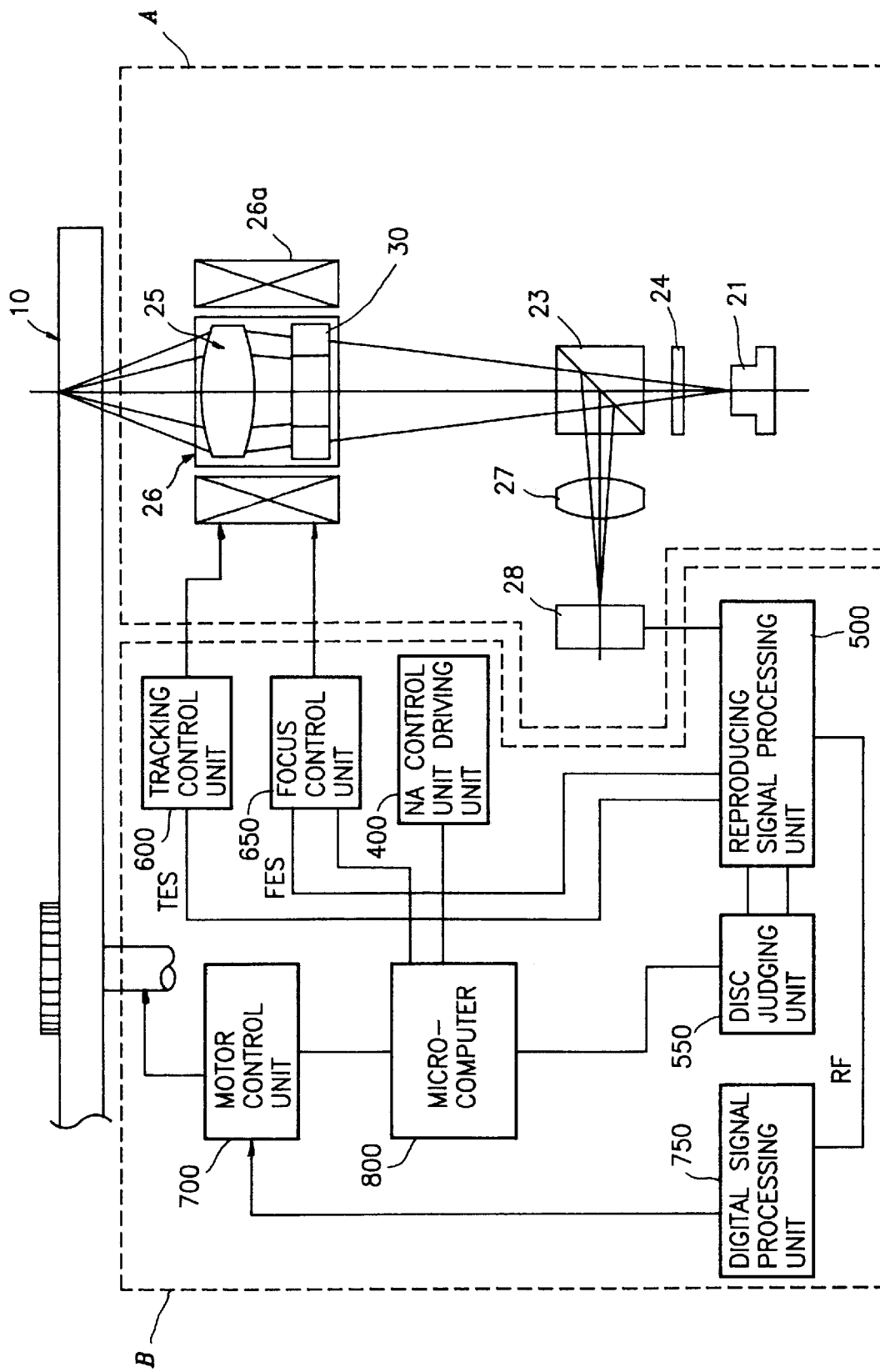
FIG. 3 is a block diagram of an optical pick-up apparatus of a first embodiment according to the present invention.

FIG. 3 shows an optical system of a first embodiment according to the present invention.

As shown therein, the optical pick-up apparatus includes an optical system "A" and a circuit system "B," as indicated as dash lines, respectively, in FIG. 3.

A beam from a light source 21 is transmitted to an objective lens 25 through a diffraction grating 24 and a beam splitter 23. In addition, a numerical aperture control unit 30 is disposed between the objective lens 25 and a beam splitter 23 for varying an effective numerical aperture of the objective lens 25 by transmitting the beam to the objective lens 25. At this time, though the numerical aperture control unit 30 is connected to an actuator driving unit 26, the objects of the numerical aperture control unit 30 can be achieved using other elements (not shown) disposed between the objective lens 25 and the light source 21 or integral between the objective lens 25 and the light source 21.

Meanwhile, the light from the numerical aperture control unit 30 is transmitted to the disc 10 through the objective lens 25. The beam deflected by the disc is transmitted to the objective lens 25 and the beam splitter 23 through the same path. In addition, the path of the optical signal modulated by the signal of the disc information writing surface is changed by the beam splitter 23 and transmitted to a photo-detector 28 through the detection sensor 27. The photo-detector 28 plays a role of converting the optical signal into an electric signal.

The electric signal outputted from the photo-detector 28 is outputted to a microcomputer 800 through a reproducing signal processing unit 500 and a disc identifying unit 550. At this time, the reproducing signal processing unit 500 outputs tracking control and focussing control signals to a tracking control unit 600 and a focus control unit 650 in accordance with a signal outputted from the photo-detector 28. In addition, a high frequency signal RF is directly outputted to the disc identifying unit 550 or a digital signal processing unit 750 at the time of processing a reproducing signal at the reproducing signal processing unit 500.

The microcomputer 800 outputs a signal corresponding to the thickness of the disc 10 to a numerical aperture control unit driving unit 400 for driving the numerical aperture control unit 30 controlling a numerical aperture corresponding to various types of discs and to a focus control unit 650 for adjusting an initial focus of the objective lens 25 and for performing a focus control, respectively, in accordance with a signal outputted from the disc identifying unit 550.

In addition, the microcomputer 800 is connected to a motor control unit 700 for controlling a spindle motor (not shown) in accordance with the type of disc 10. The motor control unit 700 is connected to the digital signal processing unit 750.

Meanwhile, the objective lens 25 is movable in accordance with a movement of an actuator driving unit 26 having an actuator driving coil 26a.

The construction of the optical system "A" including an LC shutter having the same function as the numerical aperture control unit 30 will now be explained.

Figure 4:
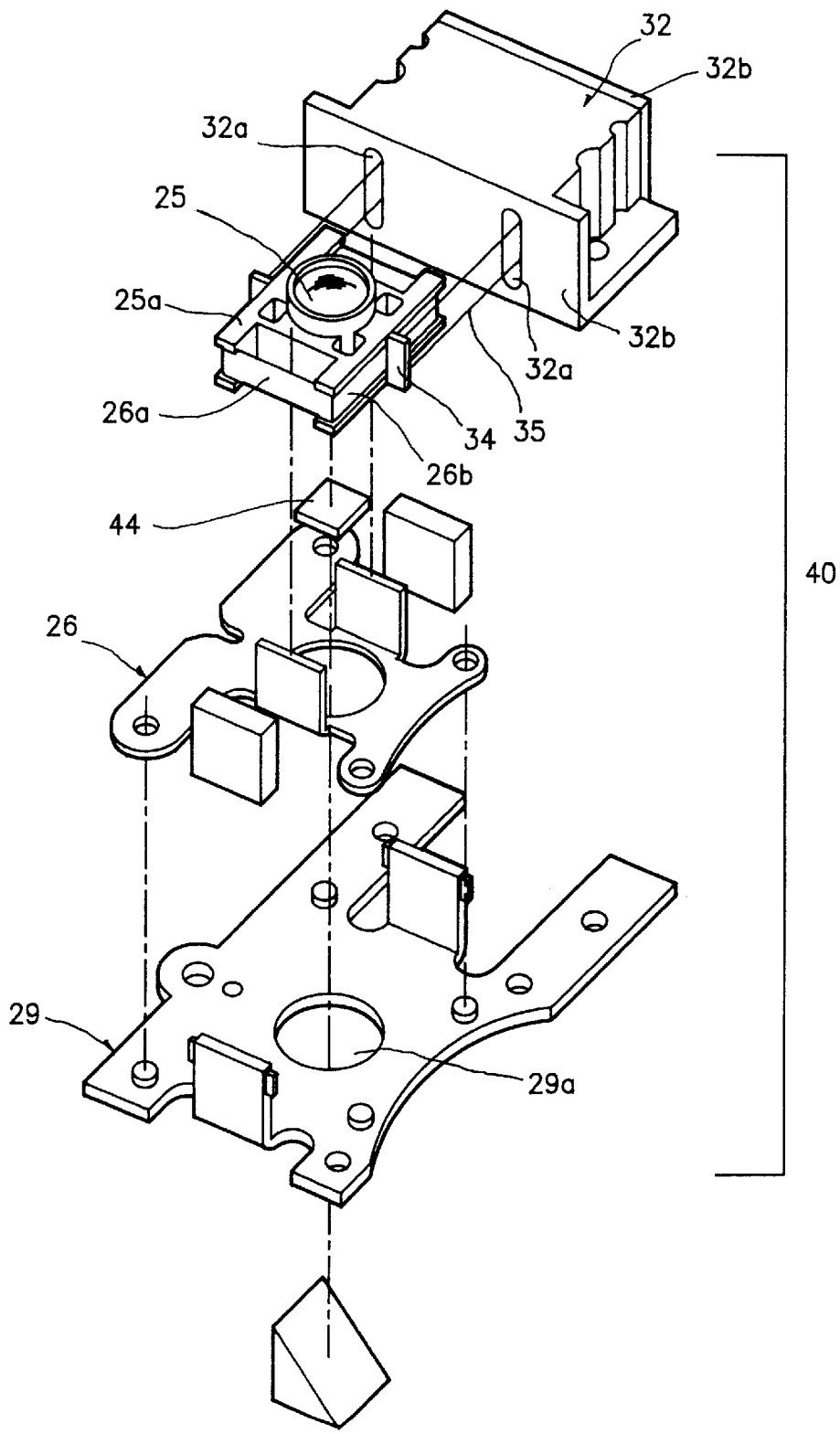
FIG. 4 is a schematic view of an actuator of an optical pick-up apparatus according to the present invention.

FIG. 4 shows an actuator having an LC shutter as one of the numerical aperture control units.

As shown therein, the actuator 40 includes a tracking coil 26a and a focus coil 26b wound onto the outer circumferential surface of a mover 25a having the objective lens 25, a yoke 26 engaged with the mover 25a, the tracking coil 26a, and the focus coil 26b, and an actuator base 29 for receiving the yoke 26. In addition, a protrusion 34 is formed at both ends of the mover 25a so that a rear plate 32b is engaged to a wire 35 through an elongated opening of a support frame 32. An opening 29a is formed at the central portion of the actuator base 29 for passing through light.

Meanwhile, an LC shutter 44 having a plurality of plates is disposed at the lower portion of the mover 25a and spaced apart from the objective lens.

Figure 5:
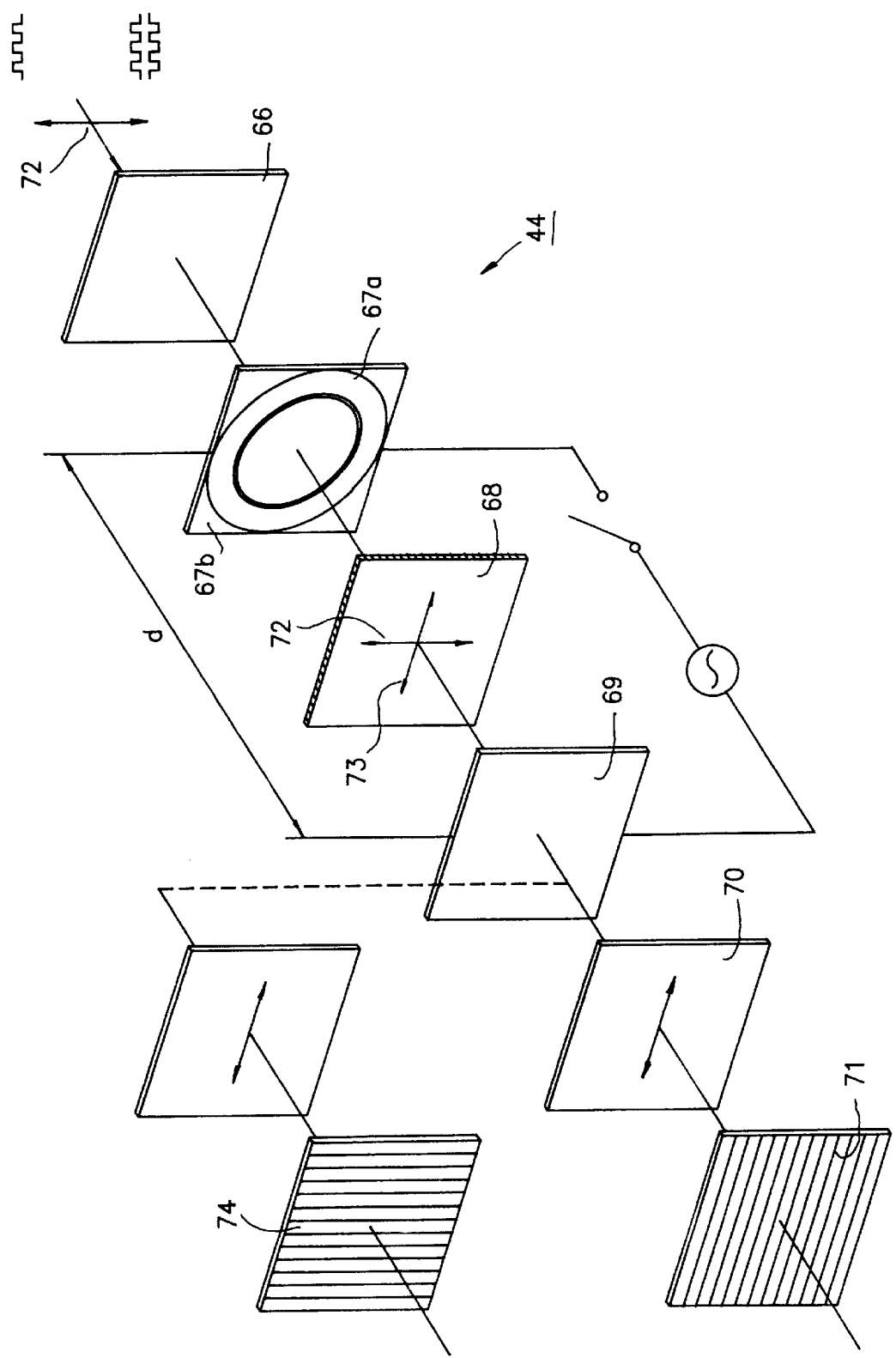
FIG. 5 is a perspective view of an LC (liquid crystal) shutter which is one element of a numerical aperture control unit according to the present invention.

Referring to FIG. 5, the LC shutter 44 is provided to have a size and shape of a bundle of lights on two transparent plates 66 and 70 so as to control the transparent electrodes 67a and 67b.

A predetermined gap "d" determined by the following expression is formed between the transparent electrodes 67a and 67b on the transparent plates 66 and 70. The minimum condition of a difference m-th order can be expressed as follows.

$$d = \sqrt{((2m)^2 - 1)} \, \lambda/2 \, \delta n$$

where a refractive index difference wherein a refractive index of ordinary beams is No, and a refractive index of extraordinary beams is Ne.

The LC shutter 44 is constituted by inserting a TN crystal liquid into a TN LC layer 68 formed in a gap of "d", and by engaging to polarizers 71 and 74 disposed on the outgoing-side transparent plate 70 to have the same direction about a polarizing direction of an outgoing light.

Referring to FIG. 5, a bundle of lights 72 incident from the incident-side transparent plate 66 pass through the transparent electrodes 67a and 67b and the TN LC layer 68. At this time, the polarizing direction of incident lights is rotated by 90° by arranging the LC of the TN LC layer 67 to have 90° inclination in a state that a power voltage is not supplied thereto and by controlling the gap of "d."

That is, as shown in FIG. 5, the rotation direction is indicated as an arrow 73.

In addition, when inserting the PDLC (polymer dispersion liquid crystal) into the LC layer 68, there is no variation of polarizing direction of an incident light passing through the LC layer 68, which is different from that of the LC based on its inherent characteristic of the PDLC. When using the above-mentioned characteristic, the PDLC does not need the above-mentioned construction though it is necessary to have an additional polarizing plate so as to block the incident light as the polarizing direction changes in the TN LC. Therefore, as shown in FIGS. 6A through 6G, the transparent electrodes 67a, 67b, and 67c are patterned and the PDLC is inserted into the LC layer instead of a TN LC. As voltage is turned on and off in the transparent electrodes, the incident light transmitted to the LC layer in which the voltage is not applied thereto is dispersed and is not incident to the outgoing-side. In addition, the incident light transmitted to the region in which the voltage is applied thereto is transmitted to the projection side.

Figure 6A:
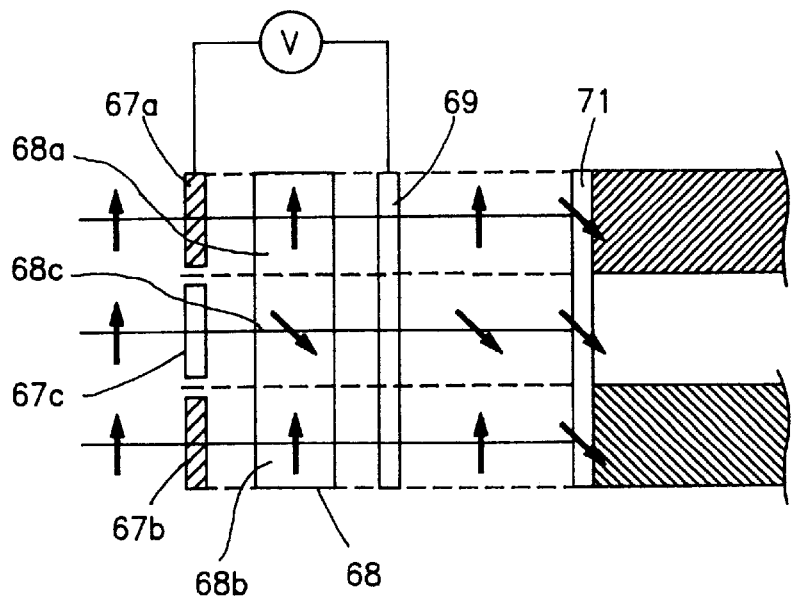
FIG. 6A is a view showing the state of a voltage applied to an LC shutter in a normal white mode according to the present invention.
Figure 6B:
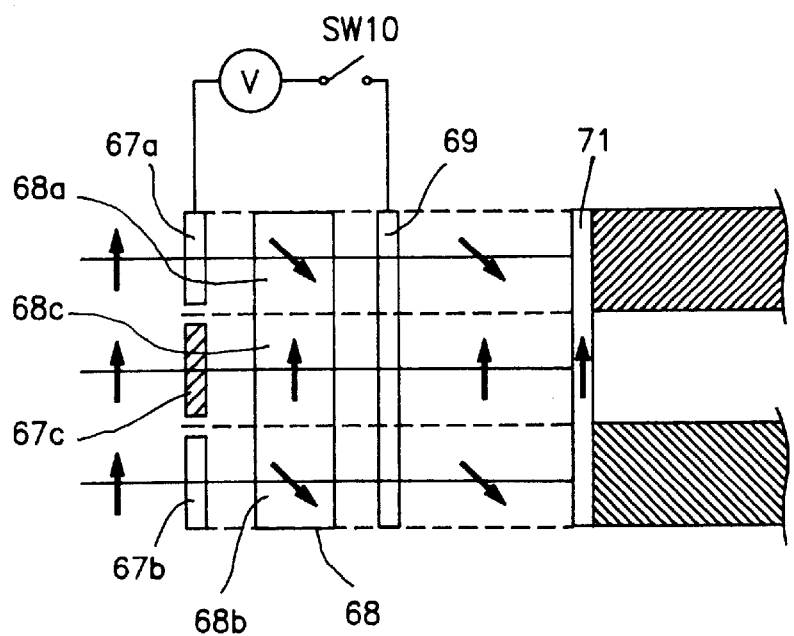
FIG. 6B is a view showing the state of a voltage applied to an LC shutter in a normal black mode according to the present invention.
Figure 6C:
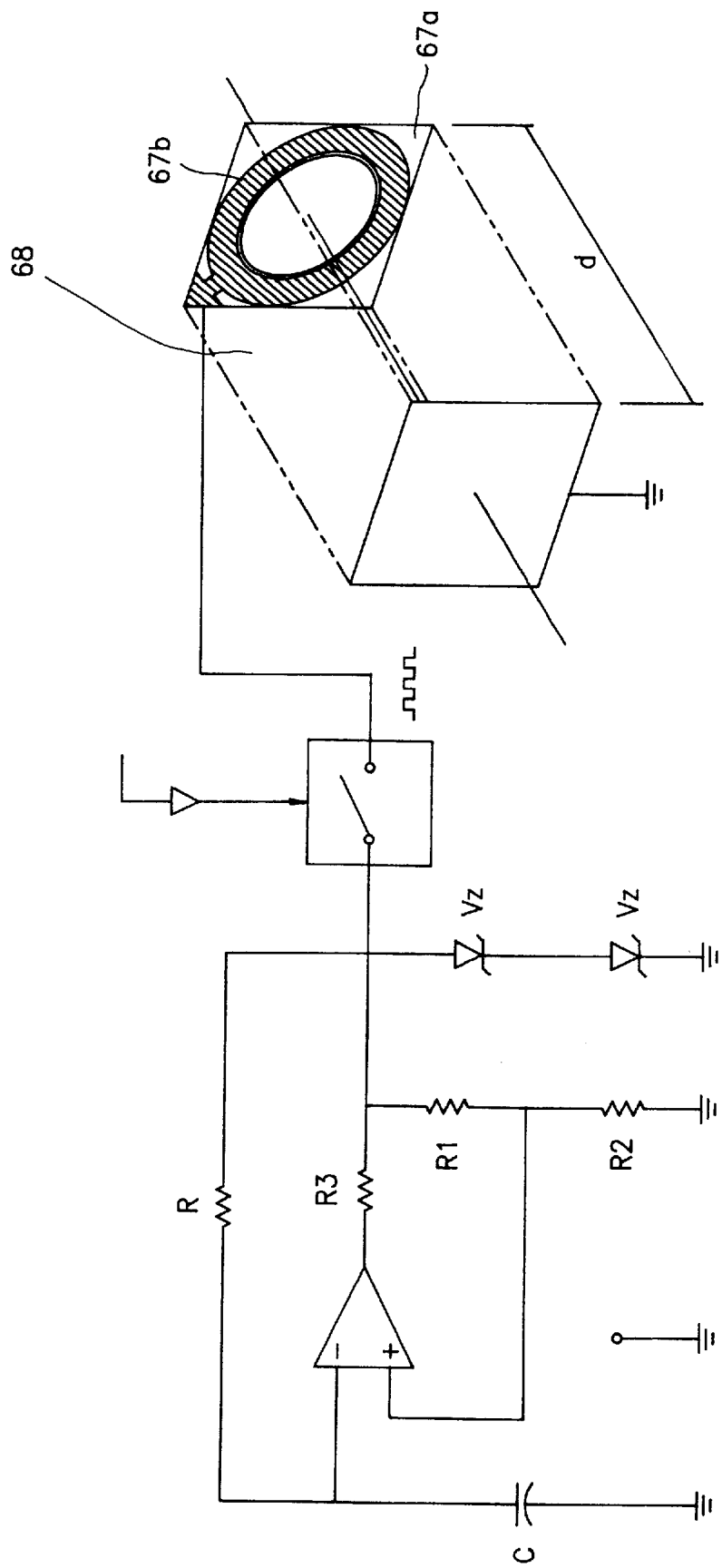
FIG. 6C is a view showing an operational example whereby voltage is applied to an LC shutter of FIG. 6C according to the present invention.
Figure 6E:
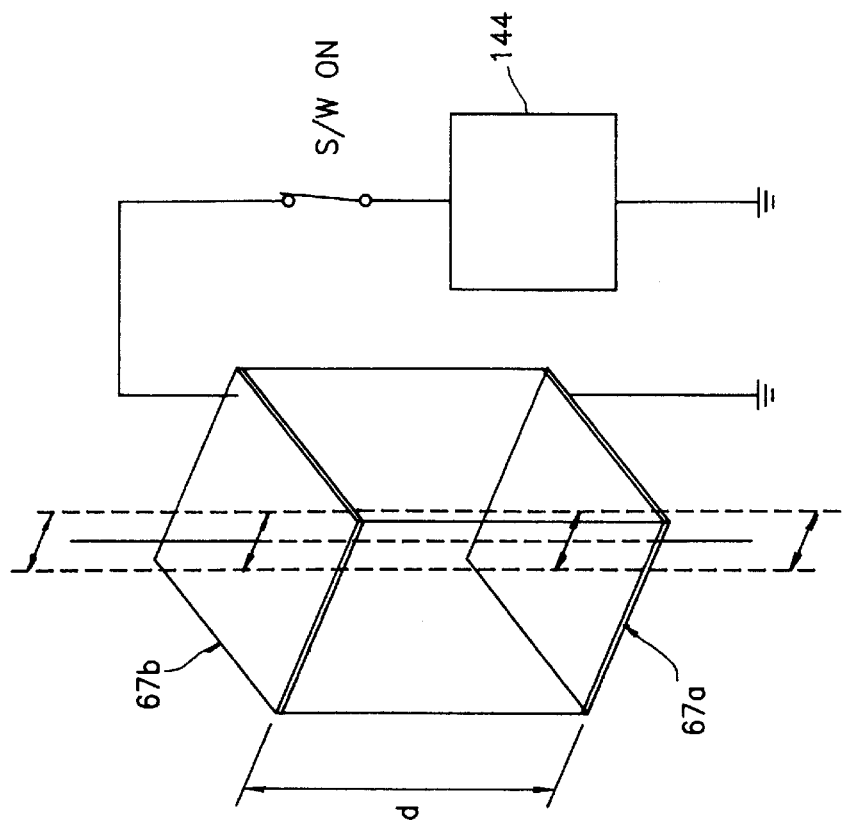
FIGS. 6D and 6E are views each showing a variation of polarization direction within a TN LCD according to the present invention.

FIG. 6A shows a state which voltage is supplied to the electrode of the LC shutter in a normal white mode, and FIG. 6B shows a variation of polarizing direction in the TN LC in a state which power voltage is supplied to the electrode of the LC shutter.

Here, the TN LC layer 68 includes layers 68a, 68b, and 68c as shown in FIG. 6A, and in case that voltage is supplied to the electrodes 67a and 67b connected to the layers 68a and 68c, the optical relational property disappears, so that since a predetermined incident polarization direction is maintained as shown in FIG. 6B, the light is blocked by the polarizing plate 71 vertically attached to the incident polarization direction as shown in FIG. 6A. However, since voltage is not applied to the layer 68b, the polarization direction rotates by 90°, and light passes through the polarizing plate 71 as shown as the arrows in FIG. 6A.

In more detail, when the LC shutter 44 is disposed to have the same direction as the polarization direction rotated by 90° under a state that power voltage is not supplied thereto, the incident light passes through the LC shutter 44. On the contrary, when a predetermined power voltage having alternating current components controlled by a wave form generator 144 is applied thereto, since the optical relational property disappears, the light is blocked by the polarizing plate 71. In this case, the polarizing direction of the last outgoing bundle of lights last outgoing has 90° rotation with respect to the polarizing direction of a first incident bundle of lights, whereby these modes are called a positive mode or a normal white mode.

Figure 6D:
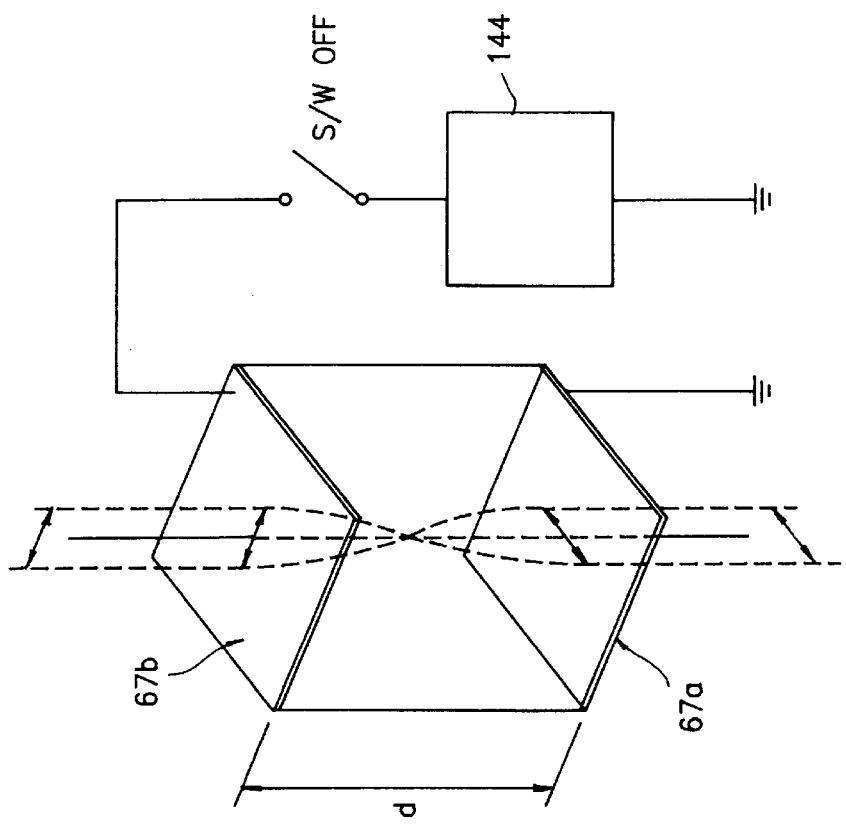

Meanwhile, FIG. 6B shows a state which voltage is supplied to the LC shutter in a normal black mode, and FIG. 6D shows a variation of polarizing direction in the TN LC a state that voltage is supplied thereto.

As shown in FIG. 6B, when voltage is supplied to the transparent electrode 67c and Lot to the transparent electrodes 67a and 67b, the switch SW10 should be controlled. That is, the transparent electrodes 67a and 67b should always be controlled independently from the transparent electrode 67c.

In more detail, in case of vertically attaching the polarizing plate 71 about the polarizing direction of the outgoing light passed through the TN LC layer 68 (for reference, FIG. 6D shows an occasion that voltage from the wave form generator 144 is not supplied to the transparent electrodes 67a and 67b), that is, the polarizing plate 71 is attached to have the same direction as the incident light, the outgoing light from the TN LC layer 68 rotates 90° and blocked by the polarization plate 71. In this case, the mode of the LC plate 68 with the polarizing plate 71 is called a negative mode or a normal black mode.

When applying voltage having an alternating current component to the electrodes of the TN LC layer 68 so that frequency and wave form, duty, and bias should correspond to the driving of the LC shutter 44, since the optical relational property of the LCD disappears, polarizing components having the same polarizing direction of the incident light while the light passes through the LCD are provided, so that a predetermined light is outputted from the polarizing plate 71 in conjunction with the outgoing-side transparent plate 70. If the above-mentioned TN LC layer 68 is adopted, it is possible to have the same polarizing direction between the last polarizing direction and the first polarizing direction.

Figure 6F:
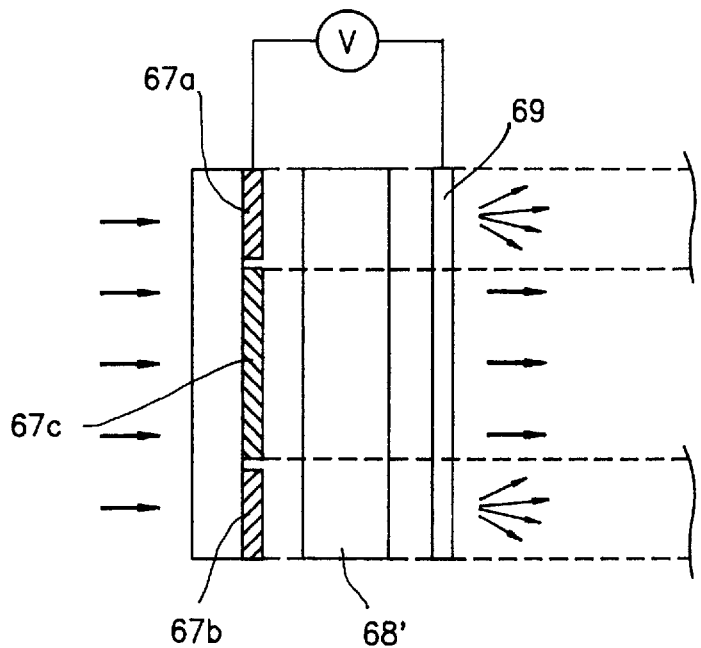
FIGS. 6F and 6G are views when voltage is applied to a liquid crystal shutter having a PDLC layer according to the present invention.
Figure 6G:
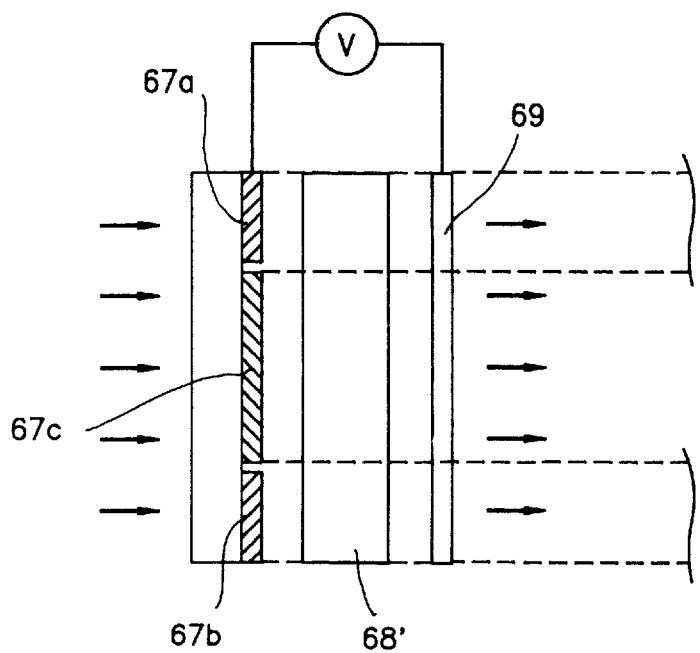
Figure 7A:
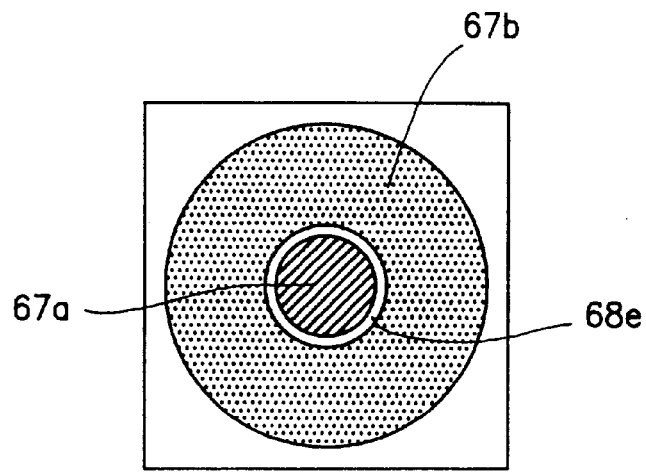
FIGS. 7A and 7B are views showing an LC pattern according to the present invention.
Figure 7B:
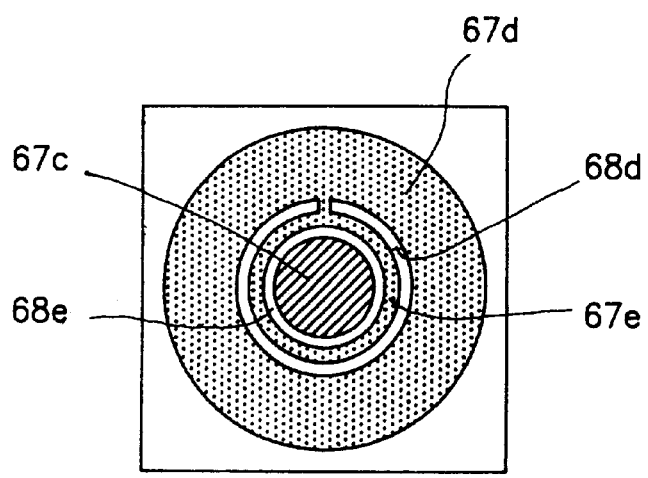

Meanwhile, FIGS. 6F and 6G show an operation states adopting the PDLC as the LC layer 68.

As shown in FIG. 6F, in case that voltage is not supplied to the transparent electrodes 67a and 67b, it is necessary to control the switches SW10 so that the power voltage is always supplied to the transparent electrode 67c and at the same time the transparent electrodes 67a and 67b are turned on and turned off.

In more detail, since the light transmitted to the PDLC layers 68'a and 68'b of the electrodes 67a and 67b in which power voltage is not supplied thereto is dispersed, the light quantity is reduced. On the contrary, the light transmitted to the PDLC layer 68'c of the transparent electrode 67c in which voltage is supplied thereto is not dispersed and passes through the projection side.

At this time, the ratio between the light quantity passed through the LC layer and the light quantity of the dispersed light meets the expression explained below.

In addition, in order to increase the numerical aperture, when supplying voltage to the transparent electrodes 67a and 67b, as shown in FIG. 6G, all the incident light is transmitted to the projection side.

Meanwhile, in case of an optical pick-up apparatus for reading the data of a high density disc, since an objective lens of high numerical aperture is necessary, in case that an aperture is high with the diffraction theory the size of the beam enlarge in a polarizing direction. In addition, in case of adopting an objective lens made of plastic, since astigmatism which occurs by birefriagence of material occurs in a polarizing direction, it is necessary to adjust the polarizing direction to be the same as the tangential line of the track formed on the disc, so that it is possible to select a desired mode because there is a certain effect to increase the S/N ratio.

In addition, in case of the LC shutter 4 with the TN LC layer 68, light leakage may occur in the light blocking region when employing the two methods above, because of errors in polarization rotation angle due to gap error between the transparent plates 66 and 70, errors with respect to the LC shutter 44 of the initial incident polarizing direction, and errors installation of the polarizing plate 71, so that it is difficult to achieve a desired performance of the optical system. In addition, when inserting the PLDC (Polymer Dispersion Liquid Crystal), since the dispersion light is incident from the region in which voltage is not supplied, changes in performance difference may occur therein when compared with when light is substantially blocked. The above-mentioned change in performance, as shown in FIG. 8B, can be expressed as a contrast ratio (C.R), as follows, when the light intensity of the light transmitting unit is "1."

CONTRAST RATIO (C.R)=Is/It where It denotes the light transmitting intensity of the light transmitting unit "A", and Is denotes the light transmitting intensity of the light blocking unit "B" or the light dispersion unit.

Figure 8A:
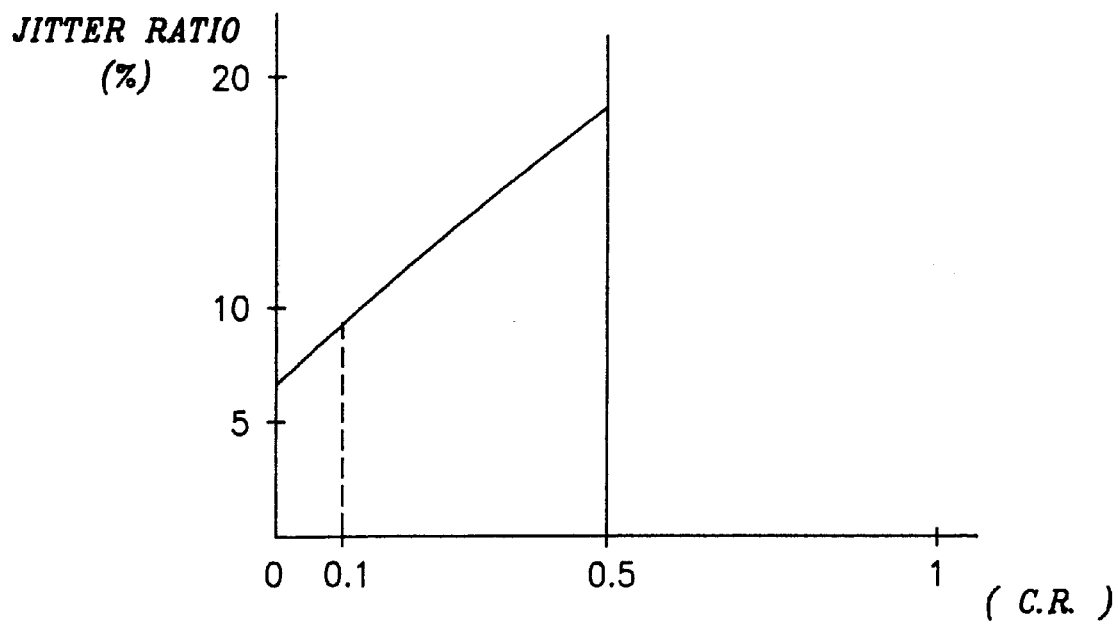
FIG. 8A is a graph showing the amount of a jitter with respect to a contrast ratio according to the present invention.
Figure 8B:
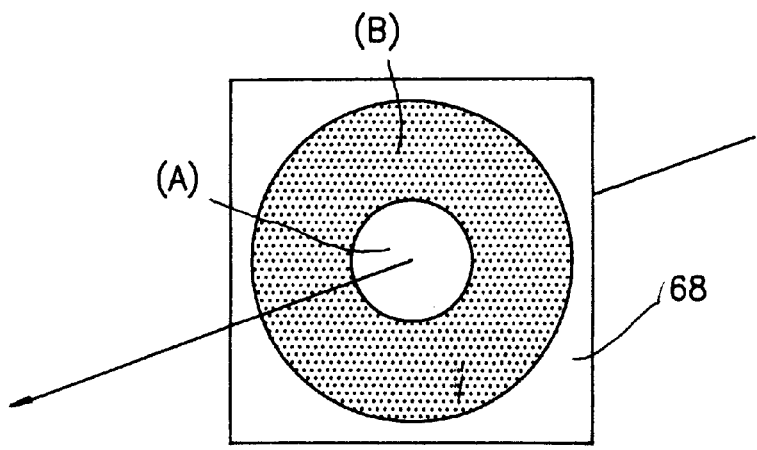
FIG. 8B is a view of a glass plate on which a transparent electrode is formed according to the present invention.
Figure 9C:
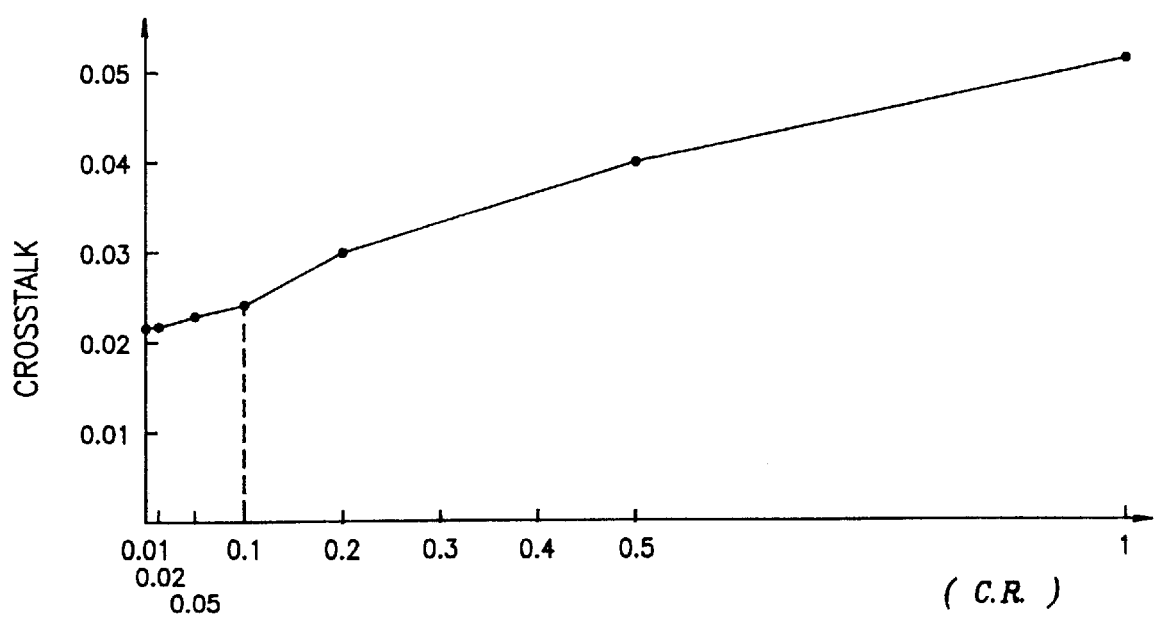
FIG. 9C is a graph showing crosstalk with respect to a contrast ratio according to the present invention.
Figure 9D:
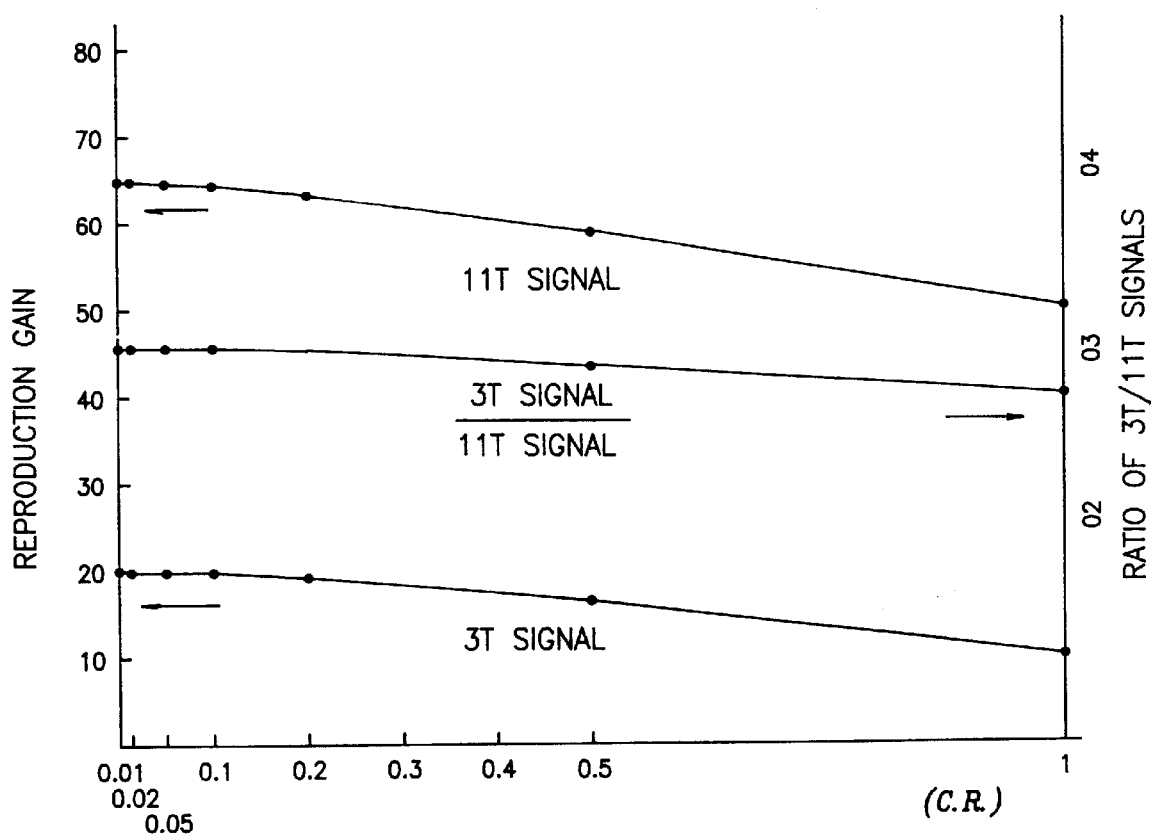
FIG. 9D is a graph showing a relationship of a relative reproducing gain with respect to a contrast ratio according to the present invention.

FIG. 8A shows a variation of jitter by the pits with respect to the contrast ratio, and FIG. 9C shows a variation of crosstalk with respect to the contrast ratio, and FIG. 9D shows a relationship of the reproducing gain with respect to the contrast ratio.

An effective region with respect to the blocking unit transmitting intensity ratio can be expressed as follows.

$0 \leq$ CONTRAST RATIO $\leq 0.1$

Since the bundle of lights passing through the LC shutter 44 have different incident diameters in accordance with whether or not the LC shutter 44 is operational, the numerical aperture varies and the objective lens 25 focuses the lights to form a focal point on the data writing surface of the disc 10. When the focal point is formed on the data writing surface, since adjusting the position thereof is necessary, and since the distance L1 etween the writing surface of the disc having a thickness of 0.6 mm and the objective lens 25 which is positioned at the initial position is closer than the distance L2 as a reference surface of the actuator 40 having the LC shutter 44 and the objective lens 25 and the side wall of the objective lens 25 at the disc 10, when the actuator driving unit 26 swings up/down from the initial position in a play mode, a point corresponding to the RF of a disc having a thickness of 0.6 mm appears first, and afterwards, another point corresponding to the RF of a disc having a thickness of 1.2 mm appears.

When there is great variation in the voltage applied to the focus coil of the actuator 40, since a relatively high voltage is necessary, wherein the $V_s$ denotes a certain voltage applied to the focus coil at a point in which an RF occurs in a disc having a thickness of 0.6 mm, and the voltage $V_c$ denotes a certain voltage applied to the focus coil at the point in which an RF occurs in a disc having a thickness of 1.2 mm, it is possible to control an initial focal point at different discs by setting $V_c$ and $V_s$ as an OFFSET voltage value of the focus control apparatus 650.

Figure 10:
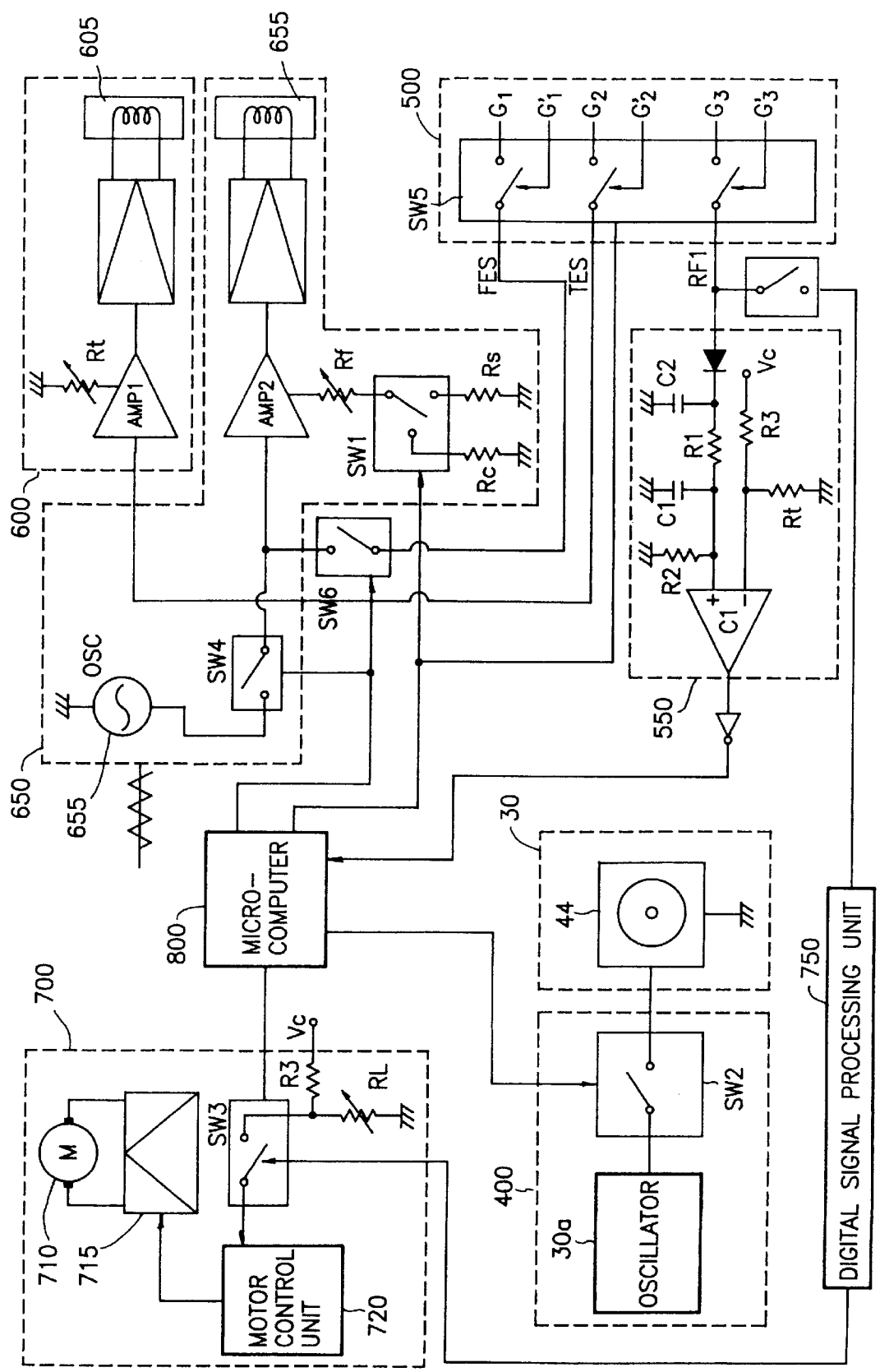
FIG. 10 is a circuit diagram of an entire circuit construction of an optical pick-up apparatus of a first embodiment according to the present invention.

FIG. 10 shows a circuit of a circuit system "B" of an optical pick-up apparatus adopted in a first embodiment of the present invention.

As shown in FIG. 10, when pressing a play key (not shown), the microcomputer 800 outputs a control signal to the switch SW1. In case that offset resistance value of the amplifier AMP2 is that of a compact disc CD, Rc is connected, and in case of a DVD, Rs is connected.

Since DC-Offset is engaged to the focus coil 655 in the focus control unit 650, the actuator 40 moves toward the disc 10. After moving the actuator 40, the microcomputer 800 turns on the switch SW2 connected to the oscillator 30a of the numerical aperture control unit 400 so as to drive the LC shutter 44, thereby decreasing the effective numerical aperture. That is, the periphery of the LC shutter becomes dim.

After decreasing the effective numerical aperture, the microcomputer 800 recognizes the disc 10, turns on the switch SW3 of the motor control unit 700, selects a certain path of the variable capacitance $R_L$, and rotates the spindle motor 710 at a lower speed. The spindle motor 710 is connected to a power voltage amplifier 715 which is connected to a motor control unit 720.

Meanwhile, the microcomputer 800 turns on the switch SW4 of the focus control unit 650, applies a triangular wave outputted from the oscillating unit 655 to the actuator 40, and swings the actuator 40. Here, the in case that the switch SW4 is turned on, the switch SW6 maintains tumed-off state, and in case that the switch SW4 is turned off, the switch SW6 is turned on.

The switch SW5 becomes activated in accordance with an operation of the switch SW1. In case of a CD, the reproducing signal processing unit 500 controls gains G1', G2' and G3', and in case of the DVD, it controls gains G1, G2 and G3.

In more detail, the reproducing signal processing unit 500 will now be explained.

Figure 11B:
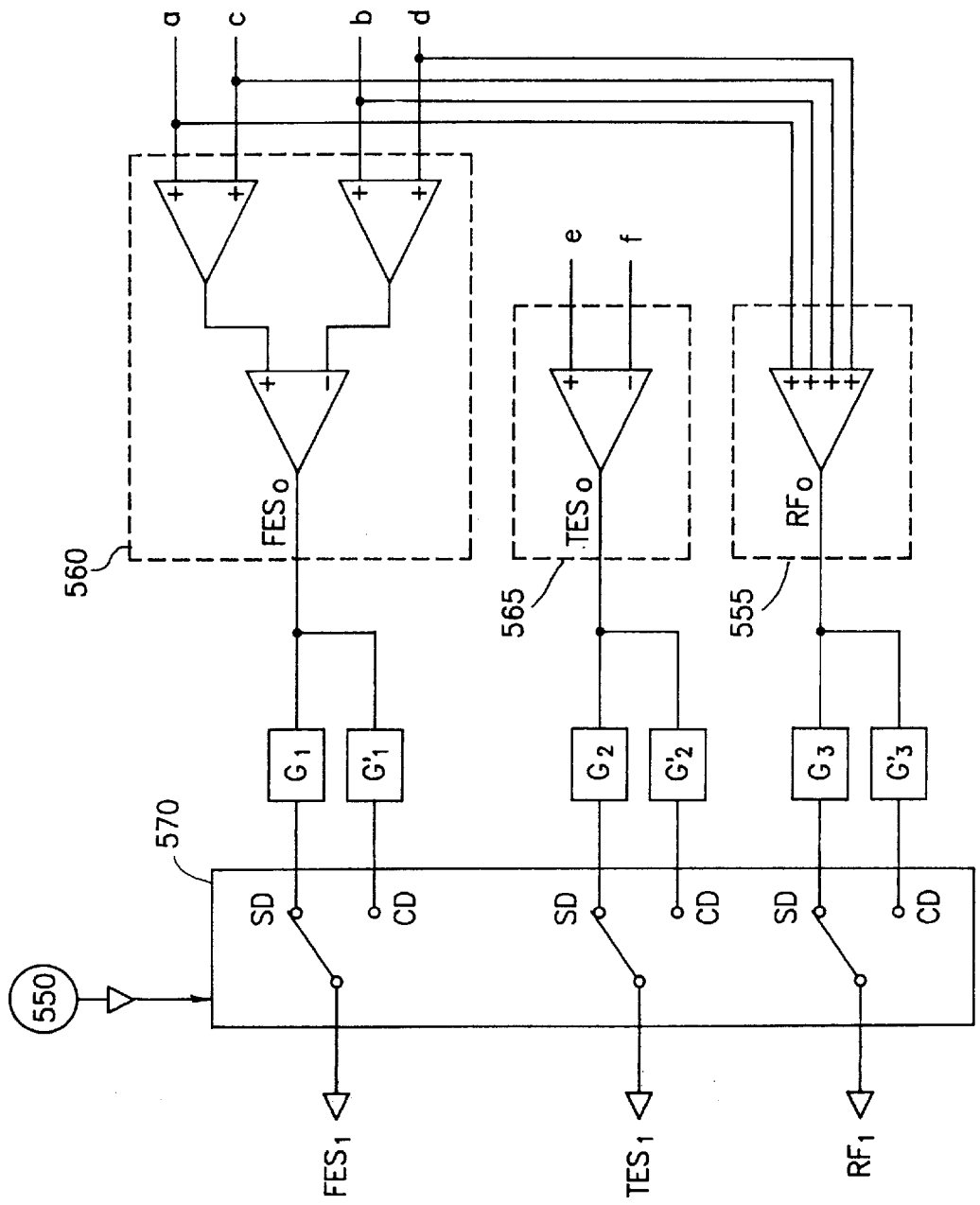
FIG. 11B is a circuit view of a reproducing signal processing unit according to the present invention.
Figure 11A:
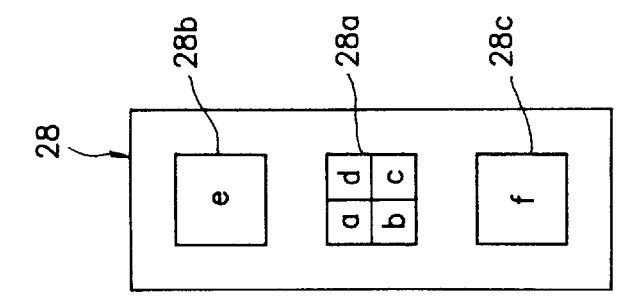
FIG. 11A is a schematic view showing a structure of a photo-detector segment according to the present invention.

FIG. 11A shows an internal construction of a photo-detector, and FIG. 11B shows a circuit of the reproducing signal processing unit.

As shown in FIG. 11A, three segments 28a, 28b, and 28c are provided in the photo-detector 28, of which the segment 28a disposed at the intermediate position thereof divided into four parts. The beam transmitted to each of the segment 28a, 28b, and 28c, as shown in FIG. 11B, is converted into an electric signal by a photoelectric effect. That is, the electric signals a, b, c, d, e, and f are computed to an RF signal, a focus error signal and a tracking error signal by an RF signal computation unit 555, a focus error computation unit 560, and a tracking error computation unit 565, respectively, so that the disc type is recognized by a logic of the disc identifying unit 550.

An analog switch array 570 (switch SW5 in FIG. 10) of the reproducing signal processing unit 500 receives the signal in accordance with an operation signal applied to the reproducing signal processing unit 500 from the photo-detector 27 detects a corresponding path, reads the DVD disc, and applies the output signal outputted from the output terminal of an operational amplifier (not shown) having a gain G (in FIG. 11B, the gain is referred to G1, G2, and G3). In case of reading a low density CD, it applies the output signal of the operational amplifier. At this time, the following expression can be obtained between the gains G and G'.

$$G \leq G'$$

The signals outputted from the operational amplifier are converted into an RF signal, a focus error signal and a tracking error signal by the RF signal computation unit 555, the focus error computation unit 560, and the tracking error computation unit 565 and transmitted to a digital signal processing unit 750, a focus control unit 650, and the tracking control unit 600, respectively.

Figure 12:
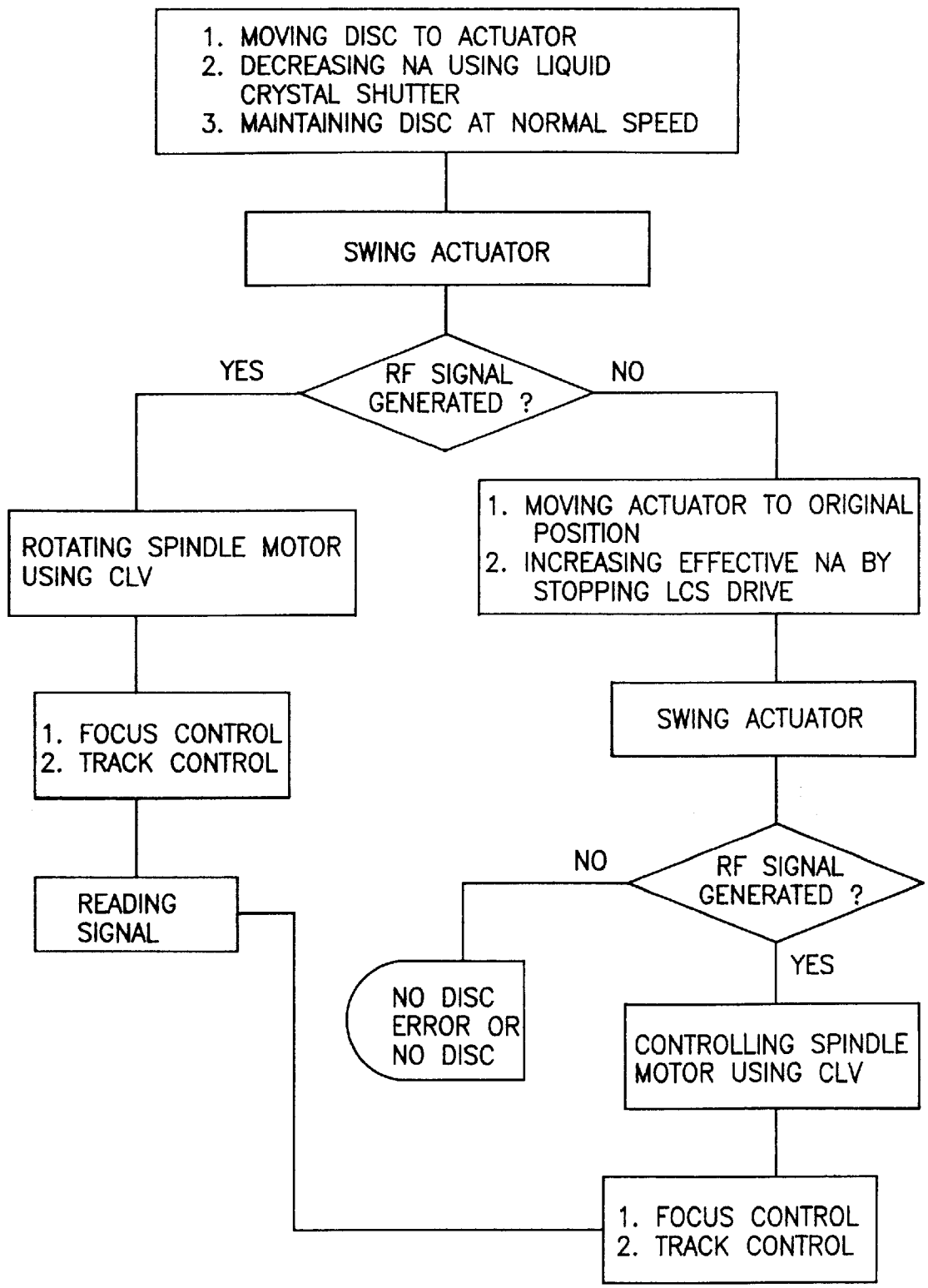
FIG. 12 is a flow chart of a disc identifying unit according to the present invention.

FIG. 12 shows a flow chart of a disc identifying unit.

In forming an optical spot on the data writing surface (not shown) of the disc 10, since the position adjustment of focus in accordance with a recognition of the disc type 10 is necessary, as shown in FIG. 12, the microcomputer 800 moves the actuator 40 to the disc 10, decreases the numerical aperture by driving the LC shutter 44, and rotates the spindle motor 710 of the motor control unit 700 at a constant speed.

Under the above-mentioned conditions, the actuator 40 is swung and it is determined whether the RF is generated. Here, it can be determined that the RF signal is generated (that is, in case of a disc having a thickness of 1.2 mm) or the RF signal is not generated (that is, in case of a disc having a thickness of 0.6 mm).

1) In case that the RF signal is generated, the spindle motor 710 is controlled by a constant linear velocity (hereinafter called the "CLV") and the number of reference rotations is controlled by the motor control unit 720. Thereafter, the focus control and tracking control signals are transmitted to the focus control unit 650 and the tracking control unit 600, respectively, through the reproducing signal processing unit 500. Thereafter, the pick-up apparatus reads out the signal.

2) In case that the RF signal is not generated, the actuator 40 returns to the initial position, and the effective numerical aperture is increased by stopping the drive of the LC shutter 44. In addition, the actuator 40 is swung. Thereafter, it is judged whether or not the RF signal is generated. At this time, in case that the RF signal is not generated, it is recognized that the disc has an error, or a disc is not present. In case that the RF signal is generated, the spindle motor 710 is controlled by the CLV, and the number of reference rotations is controlled by the motor control unit 720. Thereafter, the signals are read out by executing focus control and tracking control by controlling the gain values.

The case when the RF signal is not generated will now be explained in more detail.

The microcomputer 800 controls the switch SW1 and sets the initial location of the actuator 40 so that the offset resistance is Rc, and when a high frequency is generated during a swing of the actuator 40, voltage is applied to a comparator C1 through the DC detection unit consisting of R1, D1, C1 and C2 of the disc identifying unit 550, and when the signal is higher than a reference voltage set by the resistances Rt and R2, it is recognized that a high frequency RF higher than an effective value, and the microcomputer recognizes that the disc is a CD type.

When the disc type is recognized, after the microcomputer 800 turns off the switch SW4, while maintaining the state of the switches SW1, SW2, and SW5, in the focus control unit 650, the tracking control unit 600, the motor control unit 700, the numerical aperture control unit 30, and the reproducing signal processing unit 500, the microcomputer 800 switches the switch SW3 after turnrng off switch SW4 and applies a control signal to the motor control unit 720, and applies the focus error signal outputted from the reproducing signal processing unit 500 to the focus control unit 650 by turning on the switch SW6, and applies the tracking error signal to the tracking control unit 600. In addition, when the switch SW3 is switched at the motor control unit 700, the motor control signal output from the digital signal processing unit 750 is applied to the motor control device 700 for CLV control. However, if an RF signal is not generated during the swing of the actuator 40, the microcomputer 800 controls the switch SW1 so that the offset capacitance to be Rs and recovers the location of the actuator 40, turns off the switch SW2 to stop the operation of the LC shutter 44, and increase the effective numerical aperture. In addition, the microcomputer 800 turns on the switch SW4 and applies the triangular wave outputted from the oscillating unit 655 in order to swing the actuator 40. In the above operation, a control signal to select a path having a certain gain corresponding to a high density disc is provided.

When the RF signal is generated during the swing operation, the comparator C1 outputs a disc recognition signal to the microcomputer 800, and the microcomputer 800 maintains of the switches SW1, SW2 and SW5. In addition, the motor control circuit 720 is controlled to control the CLV using a sink signal. When the switch SW6 is turned on, the FES signal is applied to the focus control unit 650, and the TES signal is applied to the tracking control unit 600 for the focussing and tracking controls.

However, when the RF signal is not generated, it means that there are no disc errors or a disc is not present therein, and an error signal is outputted and the operation stops.

The case when an iris type shutter is used instead of adopting the LC shutter 44 as an numerical aperture control unit will now be explained in more detail.

Figure 13:
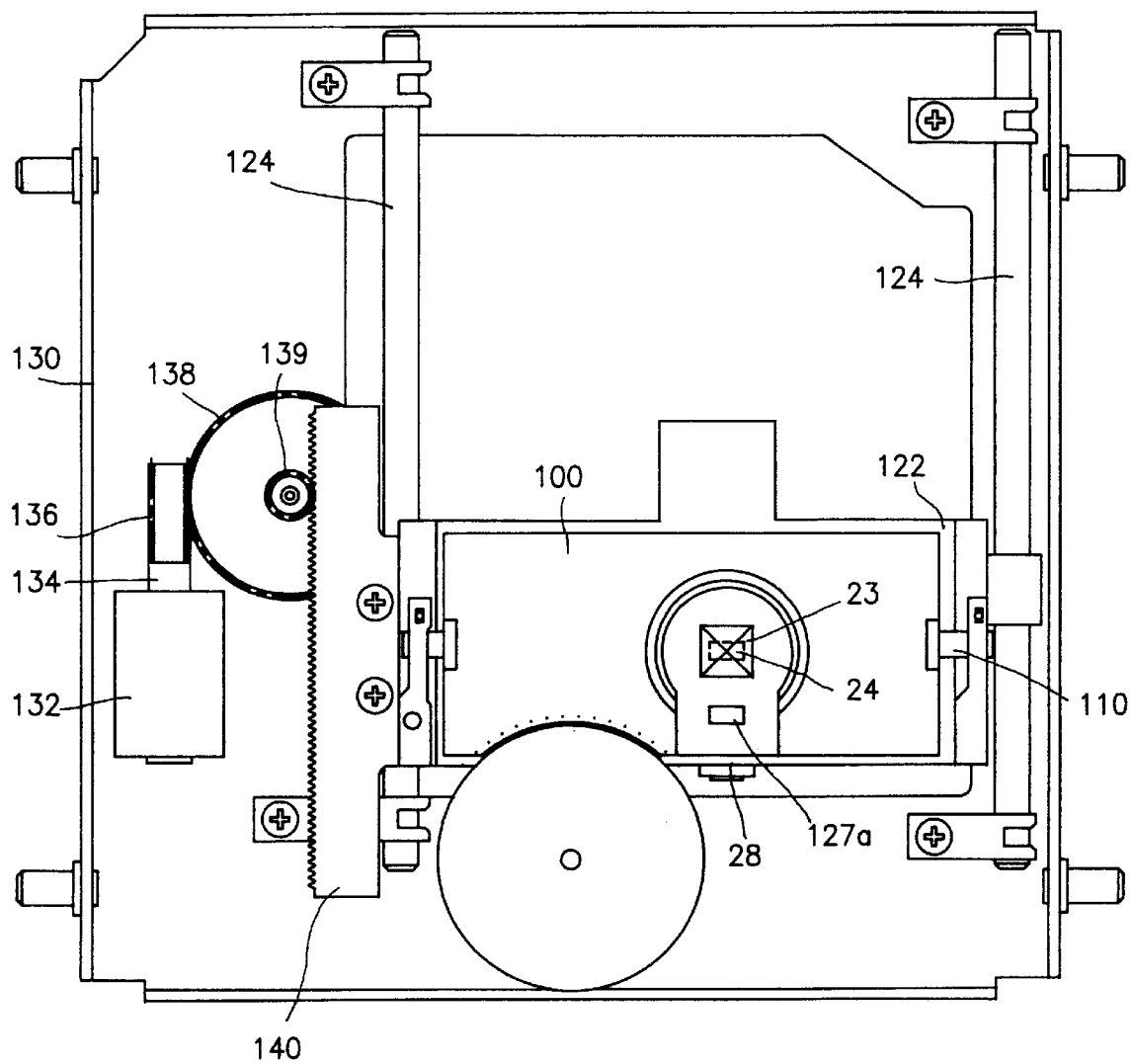
FIG. 13 is a plan view showing an optical pick-up apparatus adopted in a first embodiment according to the present invention.

FIG. 13 shows an optical pick-up apparatus of a first embodiment according to the present invention.

As shown in FIG. 13, reference numeral 130 denotes a deck of a player. A pick-up transferring motor 132 is disposed at one side of the deck 130 for transferring the pick-up. A first gear 136 is disposed at the upper portion of shaft 134 of the pick-up transferring motor 132 and the first gear 136 is intermeshed with the second gear 138. In addition, a third gear 139 is disposed at the upper portion of the second gear 138. The third gear 139 is intermeshed with a lack gear 140 so as to transfer the driving force of the motor 132 to the lack gear 140 connected to the carrier 122.

In addition, a pick-up base 100 is disposed on the upper portion of the carrier 122, and the carrier 122 is supported by a shaft 124. In addition, a shaft 110 is disposed on both ends of the pick-up base 100.

Figure 14:
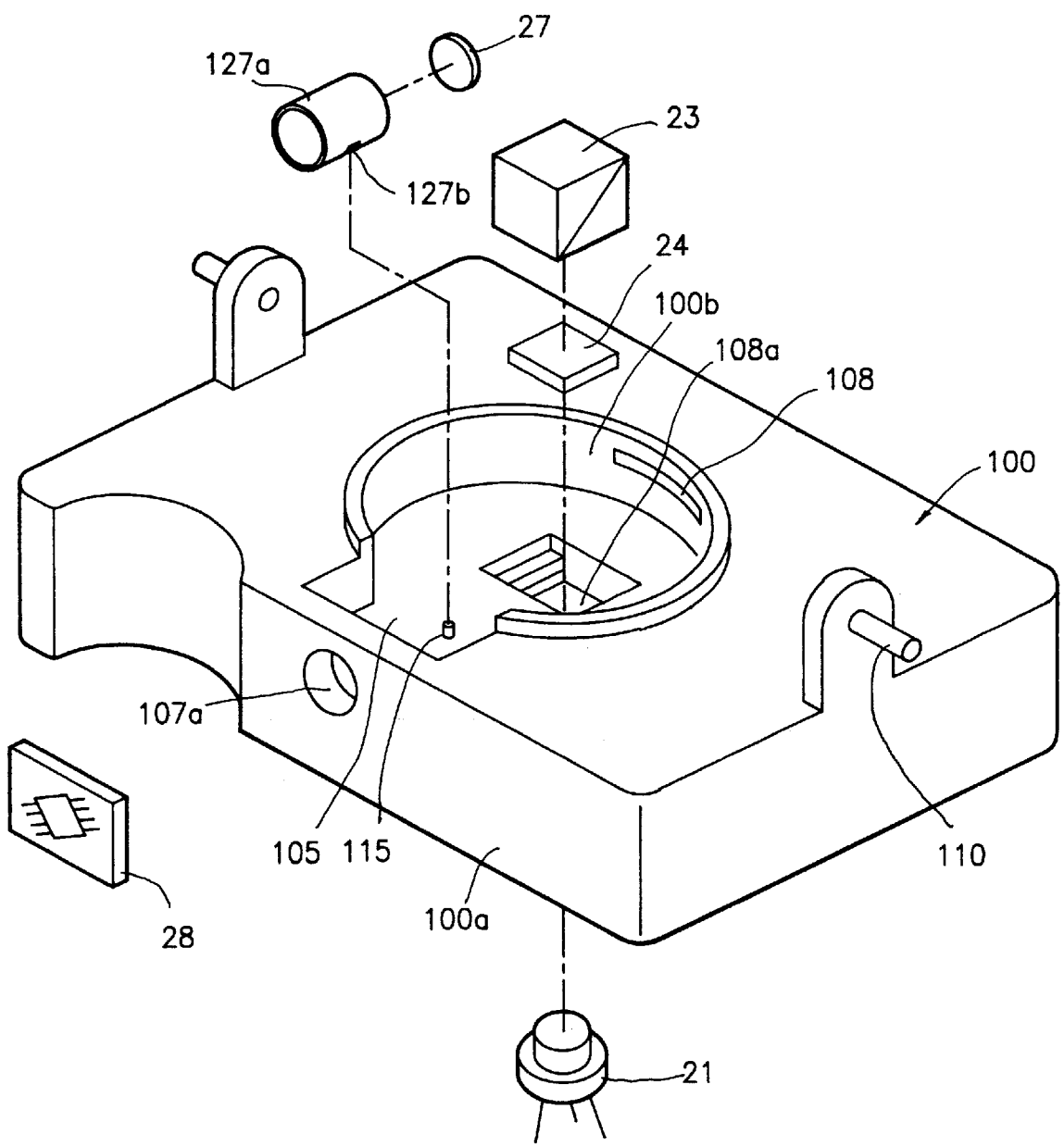
FIG. 14 is a perspective view of a pick-up base according to the present invention.

FIG. 14 shows a pick-up base of FIG. 13.

As shown in FIG. 14, a predetermined gap 105 is formed at the central portion of the pick-up base 100. An engaging section 108a is formed at a central portion of the gap 105, and a diffraction grating 24 and a beam splitter 23 are disposed on a portion of the engaging portion 108a.

A protrusion 115 is formed at a side of the beam splitter 23 for fixing the detection lens 27. The detection lens 27 is engaged to a cylindrical detection lens holder 127a, and an opening 127b is formed on the lower portion of the detection lens holder 127a so as to detachably engage to the protrusion. In addition, an opening 107a formed at a predetermined portion of the side wall 100a of the pick-up base 100. The photo-detector 28 is inserted into the opening 107a.

Meanwhile, a shutter engaging opening 108 is formed at the inner side wall of the gap.

Figure 15:
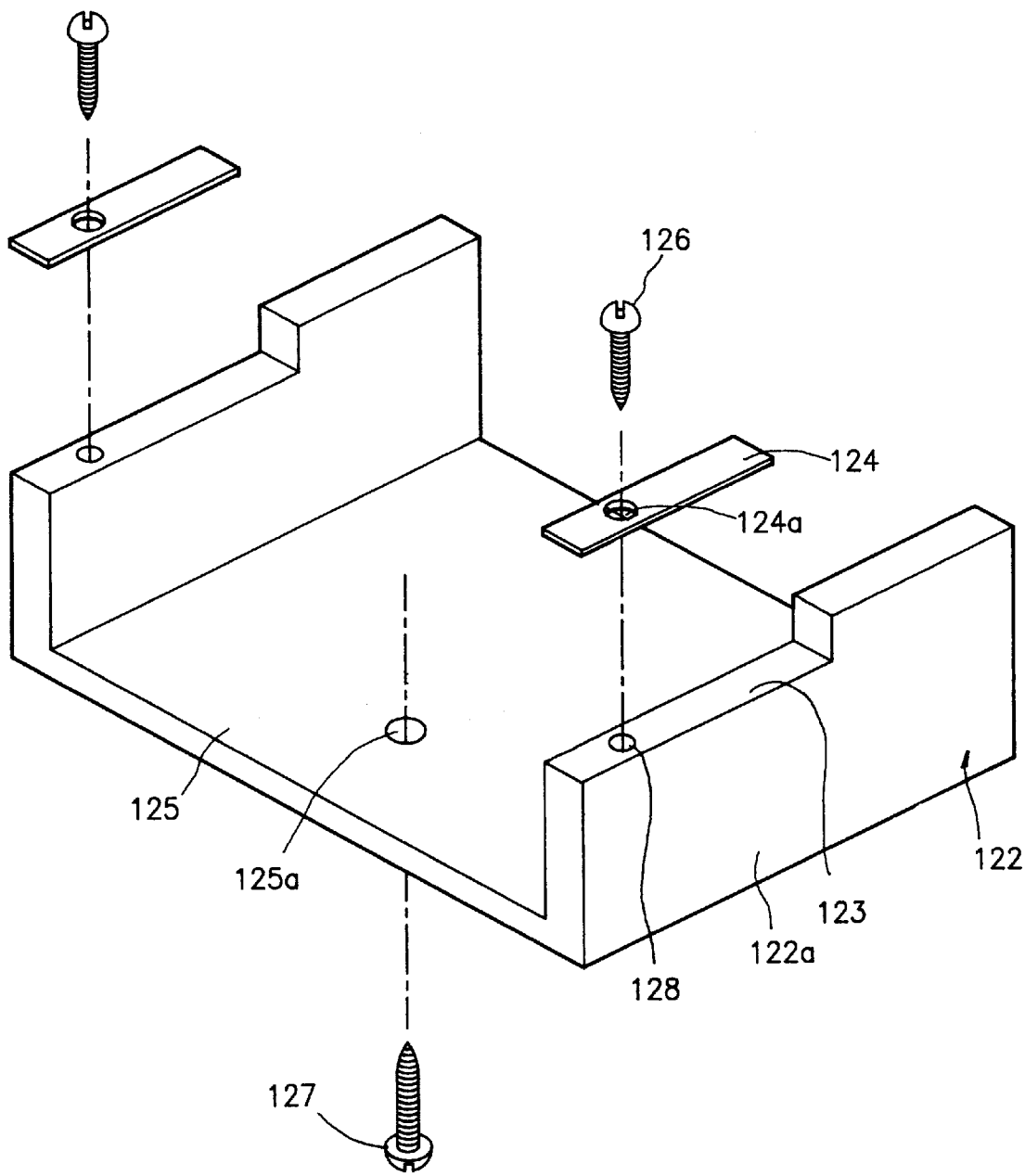
FIG. 15 is a perspective view showing a carrier in cooperation with the pick-up base of FIG. 14 according to the present invention.

FIG. 15 shows a carrier which connect to the pick-up base.

As shown in FIG. 15, a carrier 122 is disposed at the bottom of the pick-up base 100, and the carrier 122 transfers the pick-up base 100. The carrier 122 is a U-shaped plate, and a plate spring 124 is disposed at the upper portion of the step-shaped side wall 122a of the carrier 122 for fixing the shaft 110 of the pick-up base 100. An opening 128 is formed on the upper surface 123 of the side wall 122a. In addition, the an opening 124a is formed at a predetermined portion of the plate spring 124, corresponding to the opening 128. In addition, the plate spring 124 is fixed to the side wall 122a of the carrier 122 by a screw 126. At this time, the shaft 110 is placed on the lower recess 123. In addition, an opening 125a is formed at a predetermined portion of the center base 125 of the carrier 122. A shutter base fixing unit 174 is disposed at the opening 125a for fixing the screw 127 as shown in FIG. 16.

The iris type shutter engaged to the shutter engaging opening 108 shown in FIG. 14 will now be explained.

Figure 16:
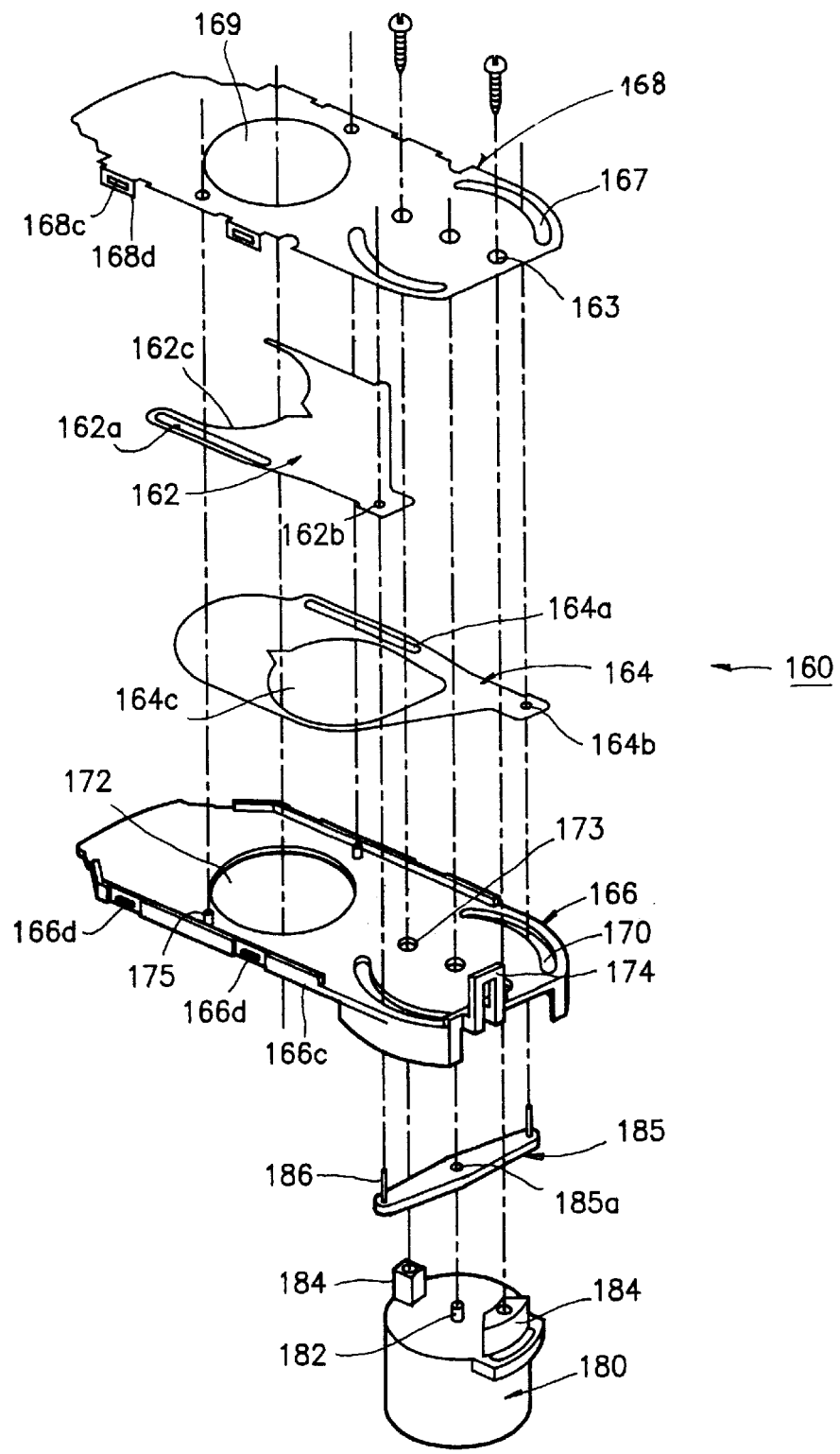
FIG. 16 is a perspective view of an iris type shutter which is one element of the numerical aperture control according to the present invention.

As shown in FIG. 16, the iris type shutter 160 includes first and second blades 162 and 164, a shutter base 166 for receiving the first and second blades 162 and 164, and a shutter cover 168 integrally engaged to the upper portion of the shutter base 166. The shutter base 166 includes a pair of elongated openings 170, and an opening 172. In addition, a plurality of spaced-apart small openings are formed between the pair of the openings 170.

The first and second blades 162 and 164 includes guiding openings 162a and 164a and openings 162b and 164b. In addition, the first blade 162 includes a cap-shaped space 162c having a side opened, and the second blade 164 includes a cap-shaped space 164c.

A fixing section 174 is outwardly protruded from one side of the shutter base 166 so as to be fixed to a carrier (not shown). A protrusion 175 is formed at the upper and lower portions of the opening 172 of the shutter base 166 so as to guide the guiding openings 162a and 164a of the first and second blades 162 and 164. In addition, a pair of protrusions 166d are formed on the outside side wall 166c of the shutter base 166. The protrusion 166d is inserted into the opening 168d of the engaging section 168c of a shutter cover 168.

Meanwhile, a motor 180 having a protruding motor shaft 182 is disposed on the lower portion of the shutter base 166. A pair of supports 184 are disposed on an upper portion of the motor 180 spaced-apart from the motor shaft 182. The motor shaft 182 inserted into a center opening 185a of a rotor 185. The rotor 185 includes a pair of protruded support shafts 186. The support shafts 186 are inserted into the elongated opening 170 formed on the shutter base 166, and the first and second blades 162 and 164 are inserted thereinto, in order. Thereafter, it is possible to move the first and second blades, 162 and 164 in the right and left directions in accordance with the drive of the motor 180.

Meanwhile, the shutter cover 168 includes an opening 169 and a pair of elongated openings 167 each formed on a predetermined portion with respect to the shutter base 166. A plurality of small openings 163 are formed between the elongated openings 167. In addition, a pair of engaging sections 168*c* are formed on both sides of the shutter cover 168 so as to integrally engage with the shutter base 166. The engaging sections 168*c* have a rectangular opening 168*d* formed in the inside portion thereof. The protrusion 166*d* formed on the outside wall 166*c* of the shutter base 166 is engaged into the opening 168*d*.

Figure 17B:
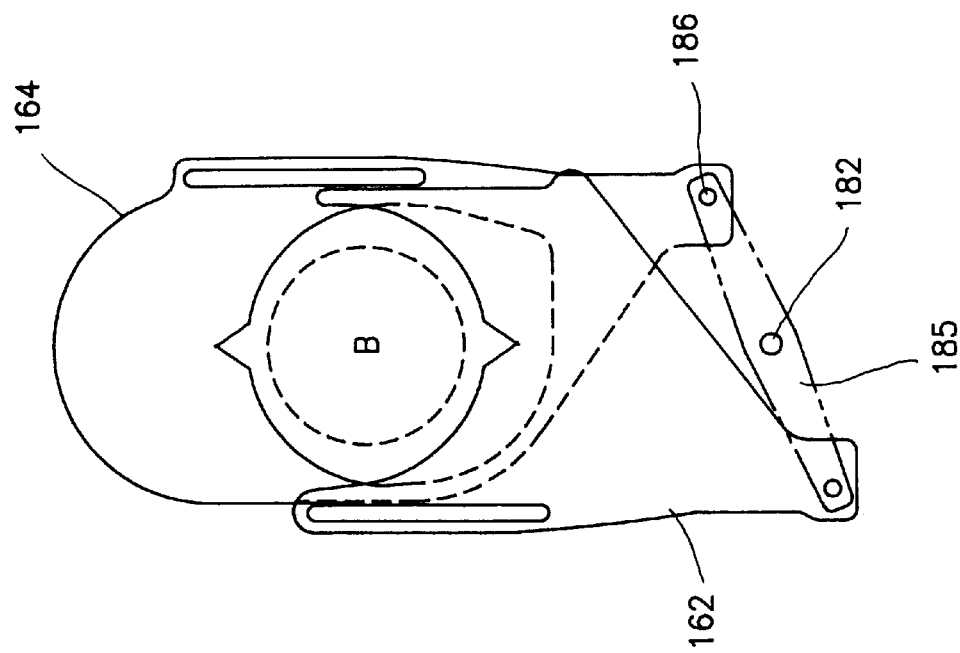
FIGS. 17A and 17B are views showing an iris type shutter adopted to having a low numeric aperture for a CD and a high numeric aperture for a DVD.
Figure 17A:
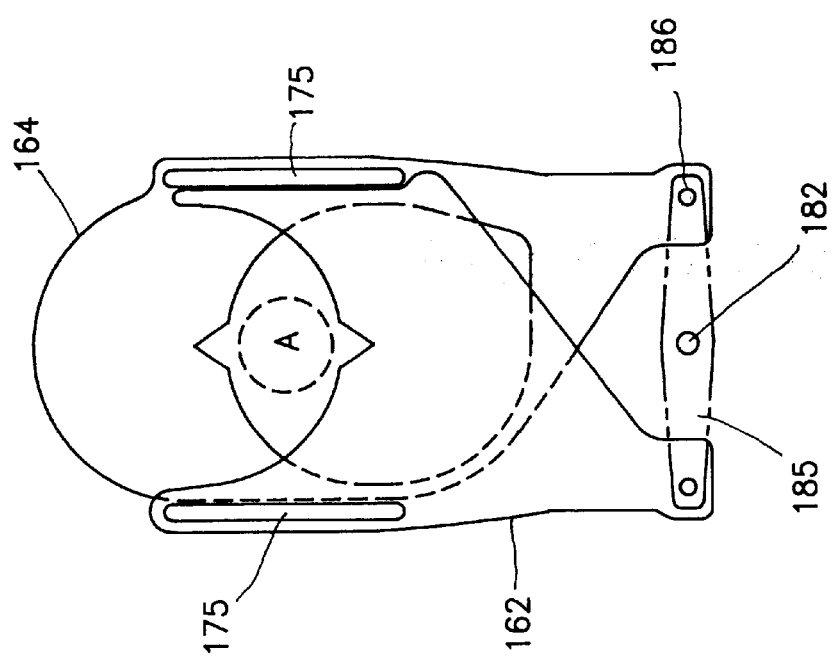

FIGS. 17A and 17B show a shutter adopted for a CD and for a DVD, respectively.

In case of using a small numerical aperture, as shown in FIG. 17A, it is necessary to use an amount of light covering an area "A", and in case of adopting a larger numerical aperture, as shown in FIG. 17B, it is necessary to use an amount of light covering an area "B."

1) In case of a small numerical aperture (FIG. 17A)

To begin with, when the motor 180 is driven, the rotor 185 drivingly connected to the motor shaft 182 is driven. At this time, the support shafts 186 fixed to both sides of the rotor 185 become movable within a range of the elongated opening 170. In case of a small numerical aperture, when the support shaft 186 engaged into the opening 162*b* of the first blade 162 moves in the right along the elongated opening 170 by half of the distance therein, the second blade 164 moves in the left along the elongated opening 170 in which the support shaft 186 engaged into the opening 164*b* by half of the distance therein. Here, since the support shaft 186 moves in the opposed direction in accordance with a movement of the rotor 185, the first and second blades 162 and 164 move in opposite direction from each other with respect to a movement of the support shaft 186.

2) In case of a large numerical aperture (FIG. 17B)

To begin with, when the motor 180 is driven, the rotor 185 engaged to the motor shaft 182 is driven. At this time, the support shafts 186 disposed at both sides of the rotor 185 become movable within a range of the elongated opening 170. In case of a large numerical aperture, when the support shaft 186 engaged into the opening 162*b* of the first blade 162 moves in the right direction along the elongated opening 170, the second blade 164 moves in the left direction along the elongated opening 170 in which the support shaft 186 engaged into the opening 164*b* faces from each other. Here, the first and second blades moves in the opposite direction.

Though the shapes of the first and second blades 162 and 164 are limited to has a wing shape shown in FIG. 16, the shapes of the first and second blades 162 and 164 (not shown) can have various kinds of shapes assuming that the shapes do not interfere with each other and adequately control the amount of light.

Figure 18:
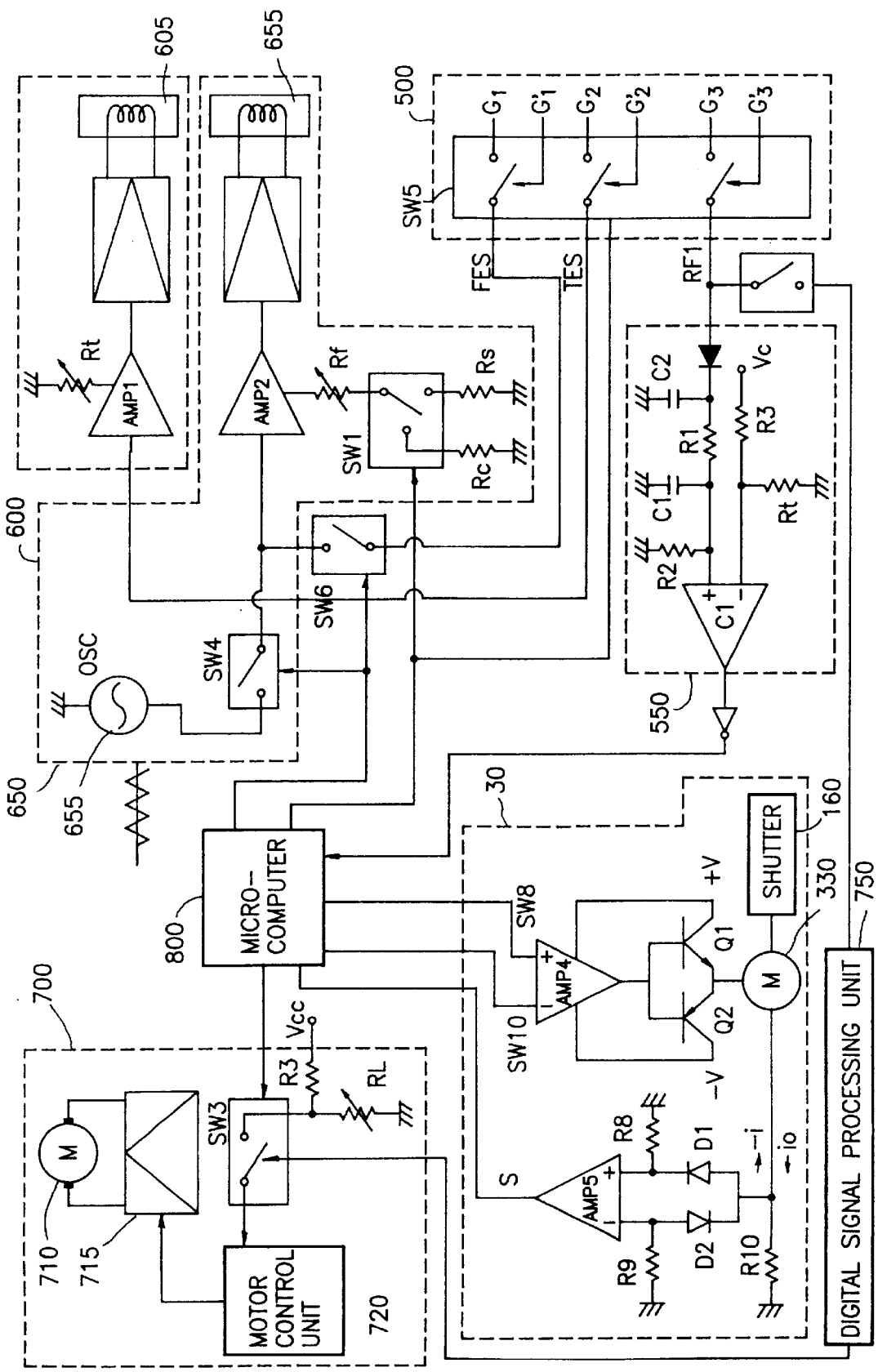
FIG. 18 is a circuit view of a numeric aperture control member in case that an iris type shutter is adopted in the optical system instead of adopting an LC shutter of a first embodiment according to the present invention.

FIG. 18 shows a circuit of an optical pick-up apparatus adopting an iris type shutter as a numerical aperture control unit.

Since the construction of FIG. 18 is the same as that of FIG. 10 except the numerical aperture control unit, the description thereof will be omitted. In addition, FIG. 19 shows a flow shaft of a motor control method when the iris type shutter is used therein.

Figure 19:
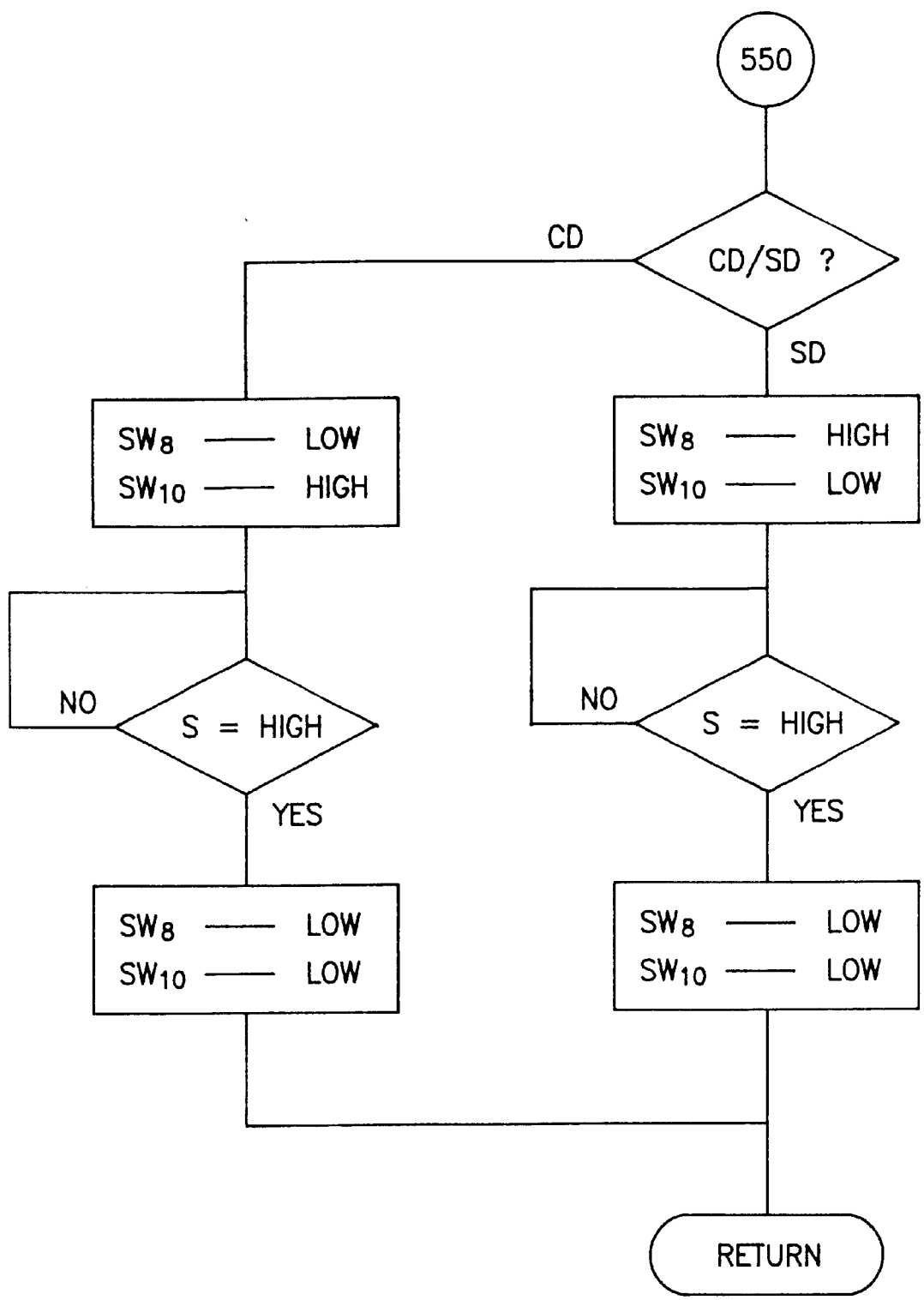
FIG. 19 is a flow chart of a numeric aperture control member of FIG. 18 according to the present invention.

As shown in FIGS. 18 and 19, in case of using a numerical aperture control unit 30 of the iris type shutter 160, when a polarized voltage is applied to the motor control apparatus 700, the iris type shutter becomes opened, and when the non-polarized voltage is applied thereto, the iris type shutter is closed. For reference, the current $i_o$, flowing to a detection resistance R10 has positive value of $+i_o$ in case of a clockwise direction rotation; however, in case of a counter-clockwise direction rotation, the current has a negative value of $-i_o$.

When a control signal of the microcomputer 800 enables the switch SW8 to be a high state and the switch SW10 to be a low state, the differential amplifier AMP4 outputs a certain value of +V, and the NPN transistor Q1 becomes electrically connected, and a positive voltage is applied to the motor 330, so that the motor rotates clockwise. At this time, the iris type shutter 160 opens. Thereafter, when the iris type shutter 160 moves to a certain amount and held in place a restriction member (not shown), an over load is applied to the motor, so the motor 330 receives a predetermined level of power voltage larger than that of a normal state. At this time, when the voltage level at the detection resistance R10 is higher than the threshold voltage of a diode D1, current flows through the diode D1, allowing current to flow through resistor R8, and the positive input terminal of the differential amplifier AMP5 receives a positive voltage, so that the output of the differential amplifier AMP5 is a high state. Thereafter, the microcomputer 800 recognizes the output in accordance with an S-signal and enables the switch SW8 to be a low state. the disc 10*a*, an actuator driving unit 46 having a driving coil 46*a* for performing an operation for moving a corresponding focus in accordance with a type of the disc, a focus control operation in accordance with a location movement of the disc 10*a*, and a tracking control operation, a disc 10*a* having at least two different thicknesses and at least two different intensities, a detection lens 47 modulated by a writing signal written on the disc 10*a* for transmitting the optical signal reflected by the objective lens 45 to a photo-detector 48 and for generating an astigmatism necessary for controlling a focus, and a photo-detector 48 for converting an optical signal into an electric signal.

Meanwhile, the numerical aperture control unit 30 of the second embodiment according to the present invention can be either an LC shutter or an iris type shutter. However, in the present invention, an iris shutter is adopted to achieve the objects of the second embodiment of the present invention.

Figure 21:
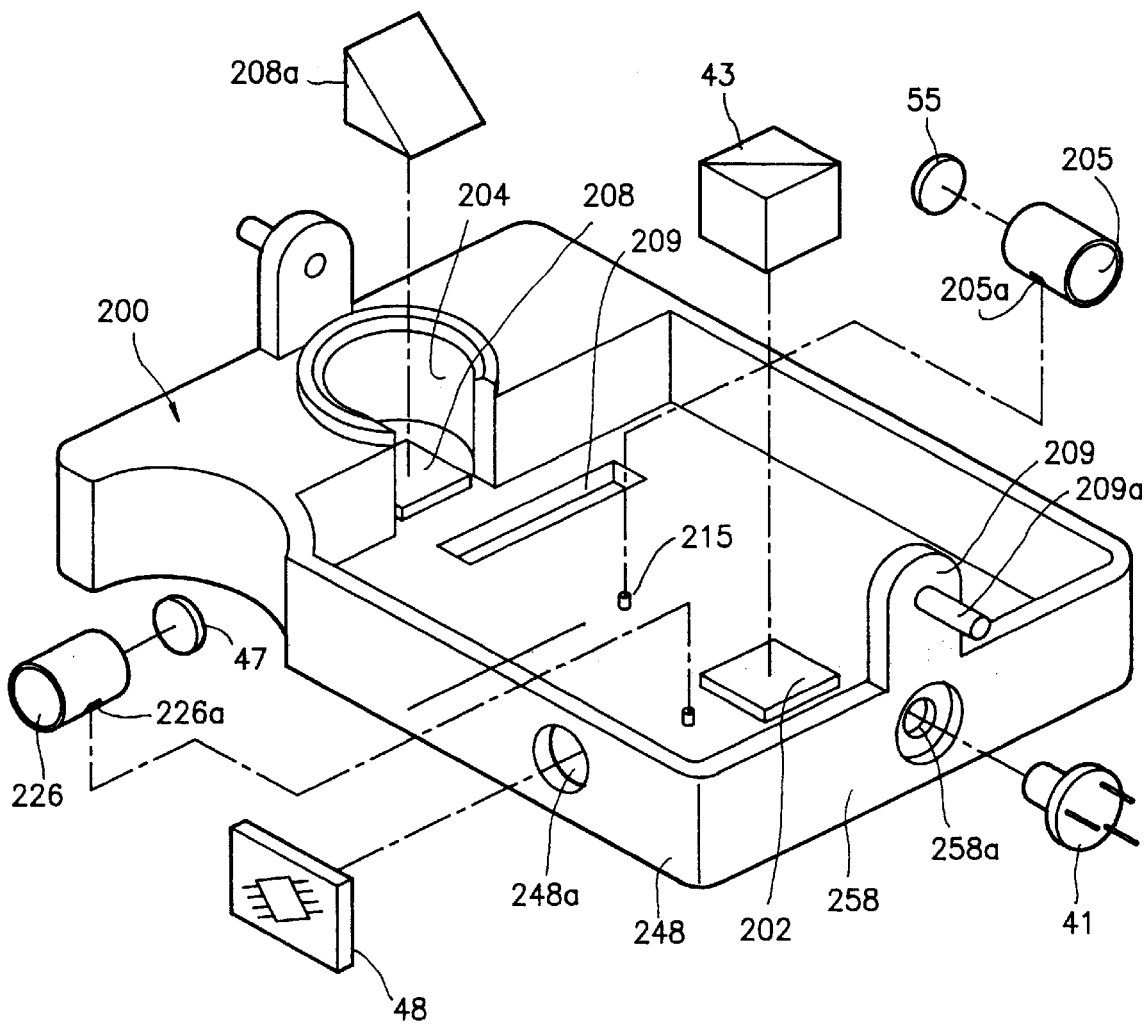
FIG. 21 is a perspective view of a pick-up base adopted in a second embodiment of the present invention.

FIG. 21 shows a pick-up base adopted in the second embodiment of the present invention.

As shown therein, reference numeral 200 denotes a pick-up base. The pick-up base 200 has a rectangular recess. and a semi-circular gap section 204. In addition, an outwardly extending shaft 209*a* is formed to be attached with a predetermined portion of the deck 130 (FIG. 13) in a protrusion section 209 formed on the central upper portion of the pick-up base 200.

A rectangular plate-shaped placement section 202 is formed on a predetermined portion of the pick-up base 200 so as to receive a beam splitter 43. A cylindrical holder 205 is disposed at the rear portion of the beam splitter 43 so as to fix the colliminating lens 55. An opening 205*a* is formed on the lower portion of the holder 205 so as to receive the protrusion 215 formed on the pick-up base behind the placement section 202. In addition, the colliminating lens 55 is detachably inserted into the holder 205.

Meanwhile, to close the iris type shutter 160 (that is, in case of reading data stored in a CD), the switch SW8 to be a low state is made and the switch SW10 to be a high state, so that the output of the differential amplifier AMP4 becomes a negative voltage of −V, and the transistor Q2 becomes activated, and the motor 330 receives a negative voltage, so that the motor 330 rotates in the reverse direction. At this time, the microcomputer 800 maintains the current state when the output voltage "S" is a low state, and when the iris type shutter 160 completely opens and it is impossible for the motor 30 to rotate in the reverse direction, the motor 330 receives an over load, and a high voltage is applied to the resistance R10, while a negative voltage is applied to the input terminal of the differential amplifier AMP5.

Therefore, when the output increases, the microcomputer 800 detects this and causes the switch SW8 to be a low state and stops to the voltage to the motor 330.

Figure 20:
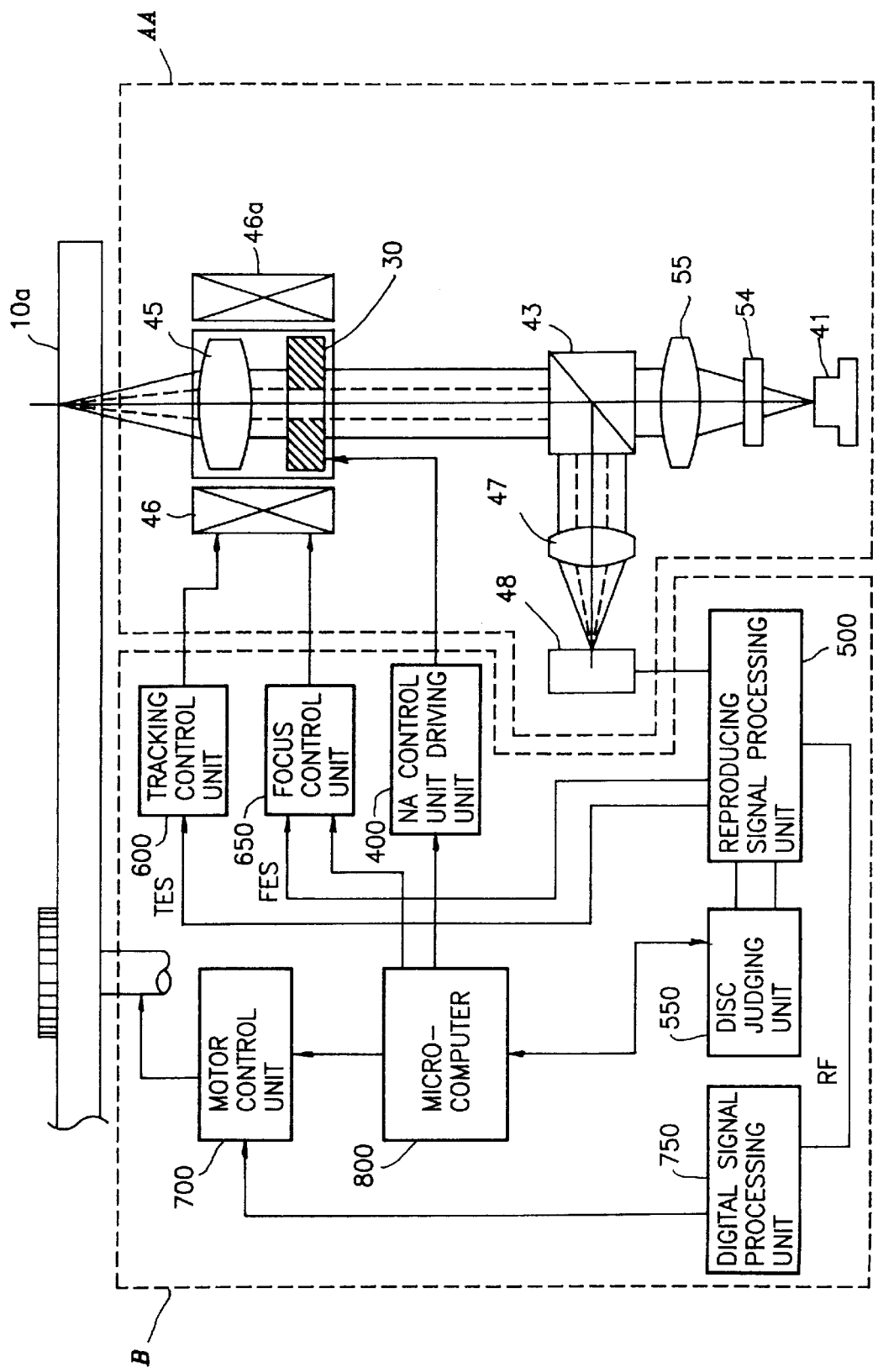
FIG. 20 is a circuit view of an optical pick-up apparatus of a second embodiment according to the present invention.

Meanwhile, FIG. 20 shows an optical pick-up system of a second embodiment according to the present invention.

The optical pick-up system of a second embodiment has the same construction as the first embodiment except for the optical system AA, only the optical system AA will be described.

Referring FIG. 20, the optical system AA includes a light source 41 such as a laser diode, a diffraction grating 54 for diffracting a beam from the light source 41 and for forming a ±1 diffraction light for a main beam and track servo, a colliminating lens 55 for outputting a parallel light, a beam splitter 43 for transmitting the light reflected by the disc 10a and for transferring the light to a detection lens 47, a numerical aperture control unit 30 for varying the width of light incident toward the disc and for varying the effective numerical aperture of an objective lens 45, an objective lens 45 for condensing the light onto the disc 10a and for receiving the optical signal modulated by a signal of A protrusion 216 is formed at the left side of the placement section 202, and the opening 226a of the holder 226 is fit over the protrusion 216 so as to fix the detection lens 47. In addition, the detection lens 47 is detachably engaged to the holder 226.

Figure 22:
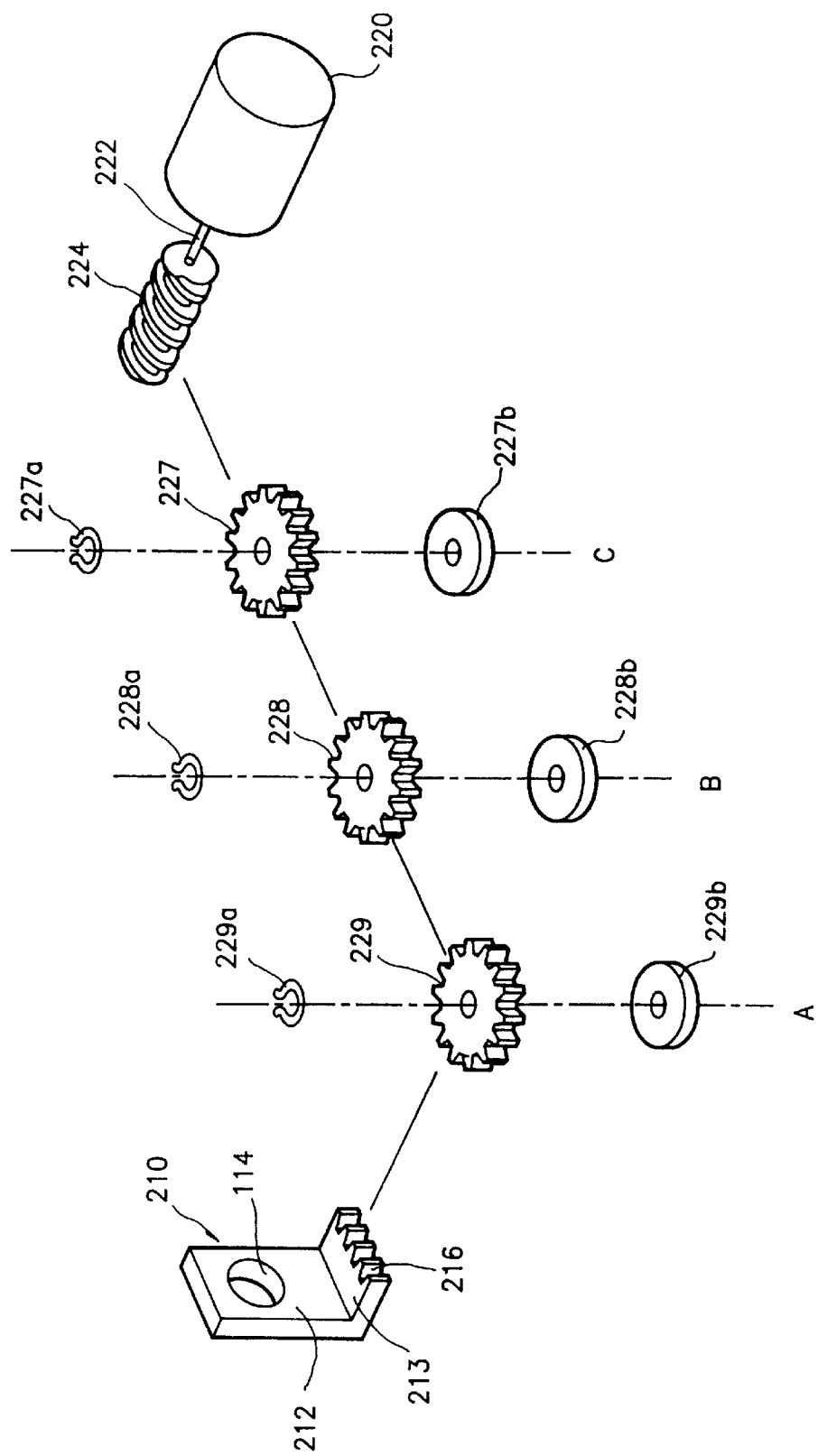
FIG. 22 is a perspective view showing a disassembled iris member adapted in the pick-up base of FIG. 21 according to the present invention.

A shutter inserting opening 209 is formed at the central portion of the pick-up base 200. An iris member 110. shown in FIG. 22 is inserted into the shutter inserting opening 209. An opening 248a is formed at a predetermined portion of the side wall 248 of the pick-up base 200 so as to receive a photo-detector 48 thereinto. In addition, an opening 258a is formed on the front side wall 258 of the pick-up base 200 so as to receive the light source 41 therein.

Meanwhile, a rectangular plate-shaped folding mirror 208a disposed at the placement section 208 may be disposed at a predetermined portion of the semi-circular opening 204.

Figure 23:
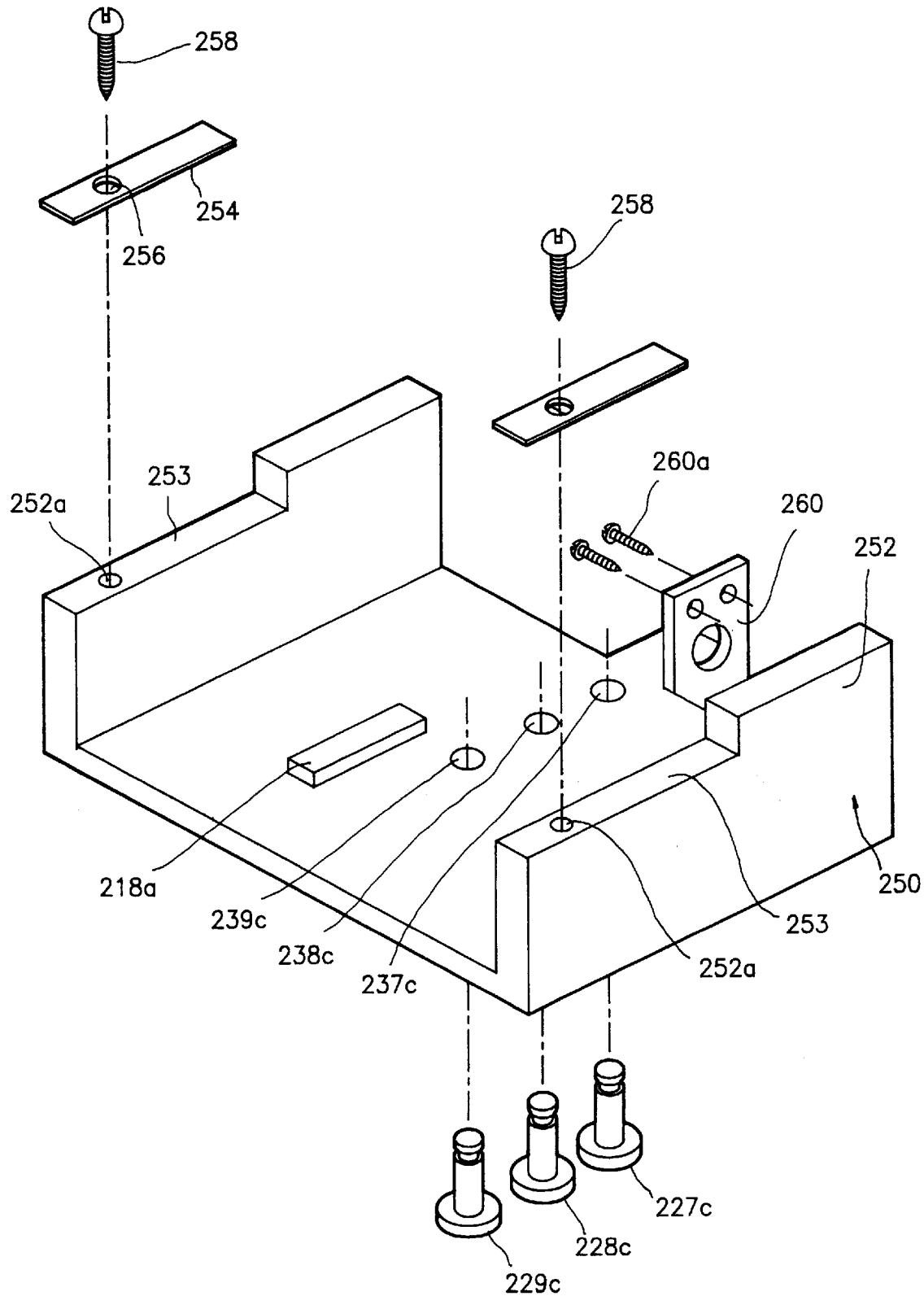
FIG. 23 is a perspective view of a carrier in cooperation with a pick-up base fixed thereto according to the present invention.

FIG. 22 shows a relationship between an iris member and a driving member adopted in the second embodiment of the present invention, and FIG. 23 shows a carrier movable in cooperation with the pick-up base.

As shown in FIG. 22, the iris member 210 has an angled portion, and an opening formed at a predetermined portion of a vertical wall 212, and a rack 216 formed on a horizontal wall 213 and having a predetermined number of teeth. A carrier 250 is disposed at a predetermined portion of the pick-up base 200 (FIG. 21), and the carrier transfers the pick-up base 200. As shown in FIG. 23, the carrier is a U-shaped plate. A plate spring 254 is disposed at the upper portion of the step-shaped side wall 252 of the carrier 250 so as to fix the pick-up base to the carrier 250. The upper surface of the side wall 252 has an opening 252a. An opening 256 is formed at the plate spring so as to match with the opening 252a. The plate spring 254 is fixed to the side walls 252 of the carrier 250 by a screw 258, and the shaft 209 of the pick-base 200 is engaged to the plate spring 254 and the upper surface 253.

Meanwhile, a motor fixing plate 260 is disposed at a predetermined portion of the side walls 252 of the carrier 250 in cooperation with the pick-up base 200, and a motor shown in FIG. 22 is disposed at the motor fixing plate 260. The motor fixing plate 260, as shown in FIG. 23, fixed by a plurality of screws 260a. In addition, the motor 220, as shown in FIG. 22, has a shaft 222 onto which a helical gear is inserted. The helical gear 224 includes first through third gears 227, 228, and 229 and connected to the rack 216 of the iris control member 210. In addition, the first through third gears 227, 228 and 229 include washers 227a, 228a, and 229a and rings 227b, 228b, and 229b, which are inserted onto corresponding shafts 227c, 228c, and 229c. The shafts 227c, 228c, and 229c are inserted into corresponding openings 237c, 238c and 239c. Numerical reference 218a denotes a placement section of the iris member 210.

The operation of the. optical pick-up apparatus capable of reading a data irrespective of disc type of the second embodiment according to the present invention will now be explained.

To begin with, a bundle of lights from the light source 41 passes through the diffraction grating 54 and is divided to produce a sub-beam, which is a first diffraction beam, necessary for a tracking servo by one-beam and three-beam methods. However, in case of the one-beam method, the diffraction grating can be omitted.

The beam is transmitted to the iris member 210 (FIG. 22) through the colliminating lens 55.

The LC shutter or an iris type shutter adopted in the first embodiment as a numerical aperture unit can be used in the second embodiment for the same. However, in the second embodiment of the present invention an iris member is adopted so as to control the numerical aperture.

Figure 24:
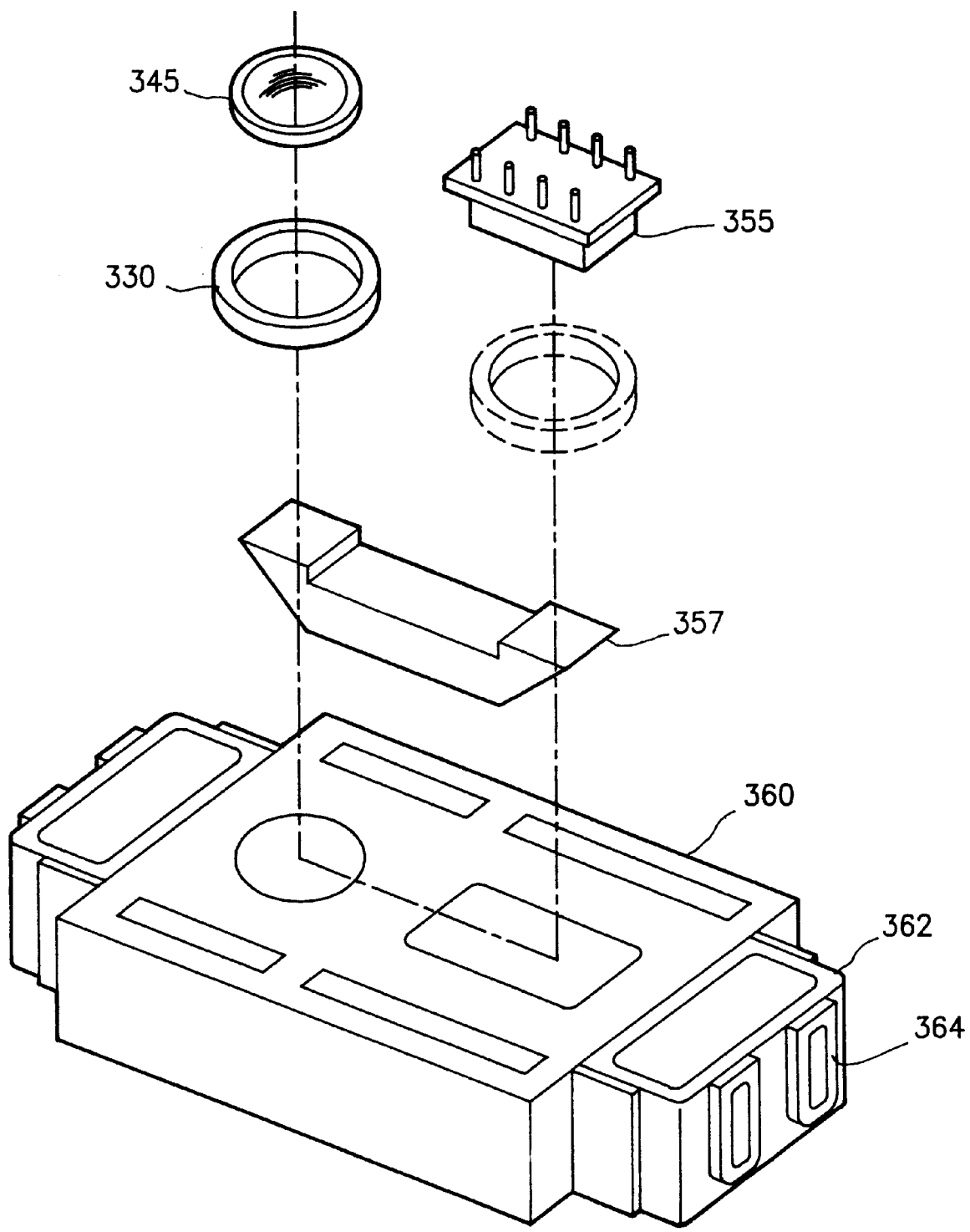
FIG. 24 is a perspective view showing a numerical aperture control unit of an optical pick-up apparatus of a laser coupler method of a third embodiment according to the present invention.

FIG. 24 shows an optical pick-up system of a laser coupler type of a third embodiment according to the present invention.

As shown in FIG. 24, the third embodiment of the present invention is directed to providing a laser coupler type of an optical system, in which the optical system is integral with a mover 360.

Figure 25:
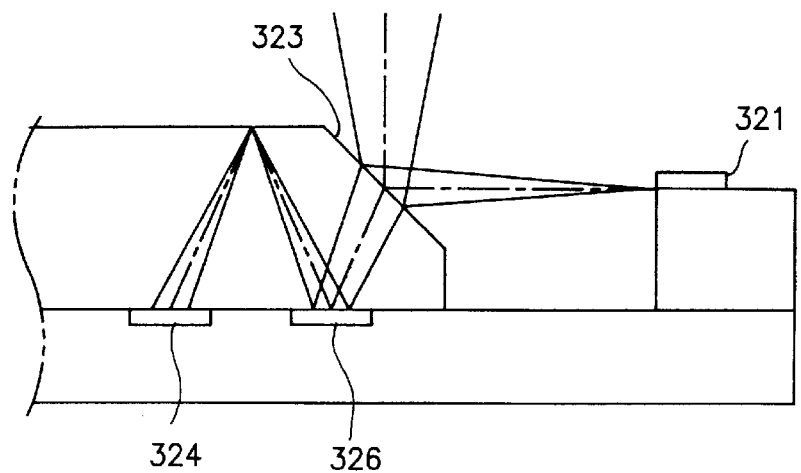
FIG. 25 is a view showing a LD/PD assembly of an optical pick-up apparatus of a laser coupler method according to the present invention.

That is, the mover 360 is integrally disposed in the optical system of the first embodiment according to the present invention. The photo-detector and the laser diode assembly shown in FIG. 24, as shown in FIGS. 24 and 25, includes a light source 321 such as a laser diode, which plays a beam splitter. In addition, the laser coupler includes two photo-detectors 322 and 324. That is, as shown in FIG. 25, the light source 321, an inclination surface 323, photo-detectors 322 and 324, and the laser diode assembly 355 are integrally disposed, so that it is possible to read out a data from a photo-detector by receiving the light from the light source 321 of the photo-detector and laser diode assembly 355 through a prism 357, by controlling a numerical aperture of an objective lens using a numerical aperture control unit and by focussing the light onto the data writing surface of a disc.

Figure 26:
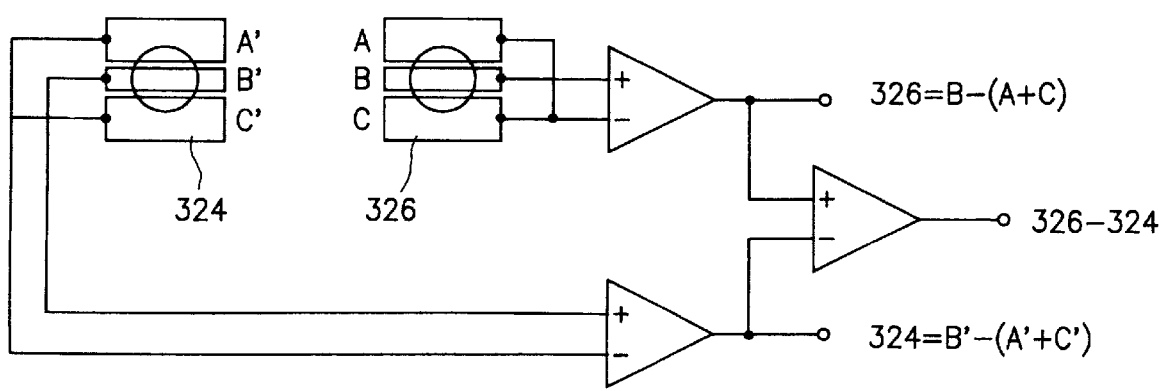
FIG. 26 is a circuit diagram of a focus error and tracking error signal detection of a laser coupler method of an optical pick-up apparatus according to the present invention.

The operation of the numerical aperture control unit is the same as in the first embodiment. In addition, the tracking servo and focussing servo methods of a laser coupler type optical pick-up system are implemented using a circuit system shown in FIG. 26. That is, since the output of the photo-detector 326 is B-(A+C), the output of the photo-detector 324 is B'-(A'+C'), the output difference between the photodetectors 326 and 324, as shown in FIG. 26 is "326–324."

As described above, the optical pick-up apparatus capable of reading data irrespective of disc type according to the present invention is directed to reading a data stored in a low density disc, a CD, or a DVD high density disc irrespective of its thickness using a numerical aperture control unit.

What is claimed is:

1. A method of irradiating a beam onto a surface of an optical disc using an objective lens, the method comprising:

identifying an optical disc type based on a thickness of the optical disc, the thickness being detected based on a position of the optical disc relative to the objective lens when a signal is detected from the optical disc;

controlling an effective numerical aperture value of the objective lens to control a size of a beam spot reaching the objective lens based on the disc identifying result; and providing an off-set voltage for controlling a position of said objective lens corresponding to the optical disc type identified.

2. The method of claim 1, wherein controlling the effective numerical aperture value of the objective lens further comprises:

controlling a position of said objective lens to control the size of the beam spot reaching the surface of the optical disc.

3. The method of claim 2, wherein controlling the position further comprises:

controlling a focus servo for focusing said objective lens onto said disc by detecting a RF signal from said optical disc.

4. A method of irradiating a beam onto a surface of an optical disc using an objective lens, the method comprising:

identifying an optical disc type based on a thickness of the optical disc, the thickness being detected based on a position of the optical disc relative to the objective lens when a signal is detected from the optical disc;

irradiating a beam having a spot size on the optical disc surface that is controlled by an objective lens whose effective numerical aperture value is controlled based on the identifying result; and providing an off-set voltage for controlling a position of said objective lens corresponding to the optical disc type identified.

5. The method of claim 4, wherein irradiating the beam further comprises:

controlling a position of said objective lens to control the size of the beam spot reaching the surface of the optical disc.

6. The method of claim 5, wherein controlling the position further comprises:

controlling a focus servo for focusing said objective lens onto said disc by detecting a RF signal from said optical disc.

7. A method of irradiating a beam onto a surface of an optical disc using an objective lens, the method comprising:

irradiating a first beam having a spot size on the optical disc surface that is controlled by an objective lens whose effective numerical aperture value is predetermined according to an anticipated disc type;

identifying an optical disc type based on a thickness of the optical disc, the thickness being detected based on a position of the optical disc relative to the objective lens when a signal is detected from the optical disc;

irradiating a second beam having a spot size on the optical disc surface that is controlled by an objective lens whose effective numerical aperture value is not consistent with the disc type identified; and providing an off-set voltage for controlling a position of said objective lens corresponding to the optical disc type identified.

8. The method of claim 7, wherein irradiating the second beam further comprises:

controlling a position of said objective lens to control the size of the spot size of the second beam reaching the surface of the optical disc.

9. The method of claim 8, wherein controlling the position further comprises:

controlling a focus servo for focusing said objective lens onto said disc by detecting a RF signal from said optical disc.

10. A method of irradiating a beam onto a surface of an optical disc using an objective lens, the method comprising:

identifying an optical disc type based on a thickness of the optical disc, the thickness being detected based on a position of the optical disc relative to the objective lens when a signal is detected from the optical disc;

compensating spherical aberrations of the objective lens to read information from the optical disc based on the identifying result; and providing an off-set voltage for controlling a position of said objective lens corresponding to the optical disc type identified.

11. The method of claim 10, wherein compensating includes:

controlling an effective numerical aperture value of the objective lens to control a size of the beam reaching the objective lens based on the disc identifying result.

12. The method of claim 10, wherein compensating further comprises:

controlling a position of said objective lens to control the size of the beam spot reaching the surface of the optical disc.

13. The method of claim 12, wherein controlling the position further comprises:

controlling a focus servo for focusing said objective lens onto said disc by detecting a RF signal from said optical disc.

14. An optical disc data pick-up apparatus that reads data from an optical disc, comprising:

an objective lens that directs a beam onto a surface of the optical disc;

a disc identifier that identifies an optical disc type based on a thickness of the optical disc from which data is to be read, the thickness being detected based on a position of the optical disc relative to the objective lens when a signal is detected from the optical disc;

a numerical aperture controller that controls an effective numerical aperture value of the objective lens to control a size of a beam spot reaching the objective lens based on results of identification by the disc identifier;

at least one light source for emitting a beam of light; and an off-set voltage provider for providing an off-set voltage corresponding to a type of said disc identified by the disc identifier to control the position of said objective lens.

15. The apparatus of claim 14, wherein said numerical aperture controller is connected to said objective lens such that a predetermined distance separates said numerical aperture controller and said objective lens during movement.

16. The apparatus of claim 14, wherein said numerical aperture controller is positioned between said objective lens and the light source.

17. The apparatus of claim 14, said optical data pick-up apparatus further comprising:

a position controller that controls said objective lens to irradiate a beam having a size corresponding to the effective numerical aperture value onto said disc.

18. The apparatus of claim 17, wherein said position controller includes:

a focus error computation unit that generates off-set voltage to focus a beam spot onto said disc identified by detecting a position of a signal generated by movement of said objective lens relative to the disc surface.

19. The apparatus of claim 14, said numerical aperture controller having a predetermined patterned lens to control a size of said beam reaching said objective lens.

* * * * *